United States Patent
Yoshioka et al.

(10) Patent No.: US 9,024,788 B2
(45) Date of Patent: May 5, 2015

(54) VEHICLE DIRECTION IDENTIFICATION DEVICE, VEHICLE DIRECTION IDENTIFICATION METHOD AND PROGRAM THEREFOR

(75) Inventors: Mototaka Yoshioka, Osaka (JP); Shinichi Yoshizawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 391 days.

(21) Appl. No.: 13/611,147

(22) Filed: Sep. 12, 2012

(65) Prior Publication Data
US 2013/0009791 A1 Jan. 10, 2013

Related U.S. Application Data

(63) Continuation of application No. PCT/JP2012/000132, filed on Jan. 11, 2012.

(30) Foreign Application Priority Data

Jan. 18, 2011 (JP) .................................. 2011-008115

(51) Int. Cl.
*G01S 3/80* (2006.01)
*G01S 5/18* (2006.01)
*G08G 1/16* (2006.01)

(52) U.S. Cl.
CPC ............ *G08G 1/166* (2013.01); *H04R 2499/13* (2013.01); *G01S 5/18* (2013.01)

(58) Field of Classification Search
USPC ...................... 340/935; 367/118–130, 99–116
See application file for complete search history.

(56) References Cited

U.S. PATENT DOCUMENTS

| 2004/0032796 A1* | 2/2004 | Chu et al. ........................ 367/123 |
| 2006/0146648 A1* | 7/2006 | Ukita .............................. 367/129 |

(Continued)

FOREIGN PATENT DOCUMENTS

| JP | 5-092767 | 12/1993 |
| JP | 9-211110 | 8/1997 |
| JP | 2009-258802 | 11/2009 |
| JP | 2010-067165 | 3/2010 |

(Continued)

OTHER PUBLICATIONS

International Search Report issued Mar. 13, 2012 in International (PCT) Application No. PCT/JP2012/000132.

(Continued)

*Primary Examiner* — Daniell L Negron
*Assistant Examiner* — John Bamert
(74) *Attorney, Agent, or Firm* — Wenderoth, Lind & Ponack, L.L.P.

(57) ABSTRACT

A vehicle direction identification device includes: a frequency analysis unit which analyzes amplitude or phase of surrounding sound in each analysis section; a sound source direction identification unit which identifies a sound source direction included in the surrounding sound for each analysis section; a vehicle identification information storage unit which stores first vehicle identification information including a first threshold value; a first vehicle identification unit which calculates a rate of occurrence of each sound source direction and identifies the sound source direction whose rate of occurrence is equal to or exceeds the first threshold value; a second vehicle identification information calculation unit which calculates second vehicle identification information including a second threshold value smaller than the first threshold value; and a second vehicle identification unit which identifies the sound source direction whose rate of occurrence is equal to or exceeds the second threshold value.

15 Claims, 24 Drawing Sheets

(56) References Cited

U.S. PATENT DOCUMENTS

| | | | |
|---|---|---|---|
| 2008/0084788 A1* | 4/2008 | Showen et al. | 367/127 |
| 2010/0030562 A1* | 2/2010 | Yoshizawa et al. | 704/270 |
| 2010/0208902 A1* | 8/2010 | Yoshizawa et al. | 381/56 |
| 2010/0214086 A1 | 8/2010 | Yoshizawa et al. | |
| 2010/0215191 A1* | 8/2010 | Yoshizawa et al. | 381/94.2 |
| 2011/0175755 A1 | 7/2011 | Yoshioka et al. | |
| 2013/0120181 A1* | 5/2013 | Hallquist et al. | 342/22 |
| 2013/0272097 A1* | 10/2013 | Kim et al. | 367/129 |

FOREIGN PATENT DOCUMENTS

| | | |
|---|---|---|
| WO | 2010/035434 | 4/2010 |
| WO | 2011/001684 | 1/2011 |

OTHER PUBLICATIONS

Hiroyuki Hoshino, "Approaching Vehicles Detection System by Using Vehicle Noise for Driver Support", The Journal of the Acoustical Society of Japan, vol. 62 (2006), No. 3, pp. 265-274, 2006, with partial English translation.

* cited by examiner

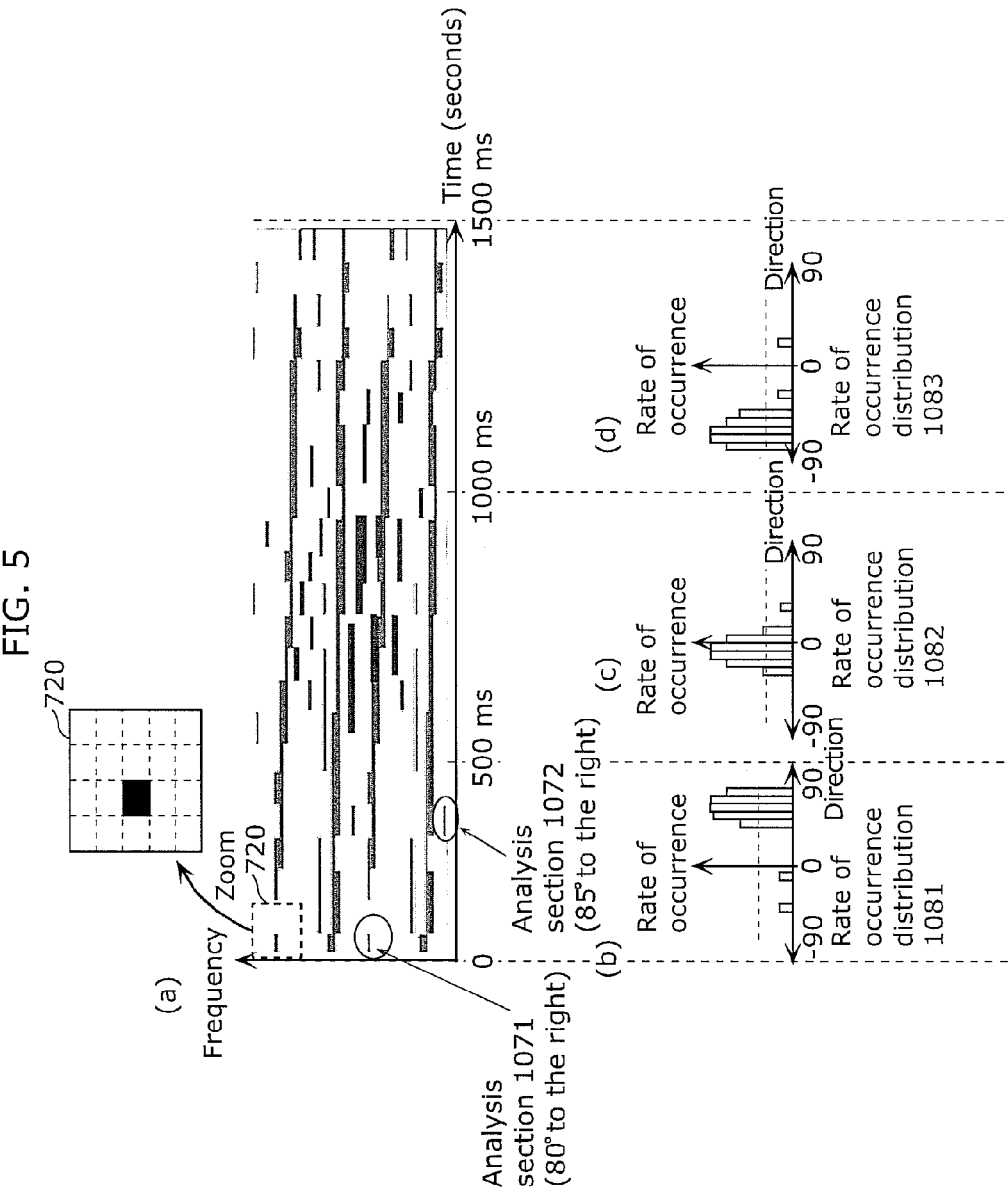

| Frequency | Threshold value (rate of occurrence) | ... |
|---|---|---|
| 50 Hz - 350 Hz | 50 | : |

| Frequency | Sound pressure (dB) | Threshold value (rate of occurrence) | ... |
|---|---|---|---|
| 50 Hz - 350 Hz | -45 | 50 | : |
| 700 Hz - 1000 Hz | -65 | 150 | : |
| : | | : | : |

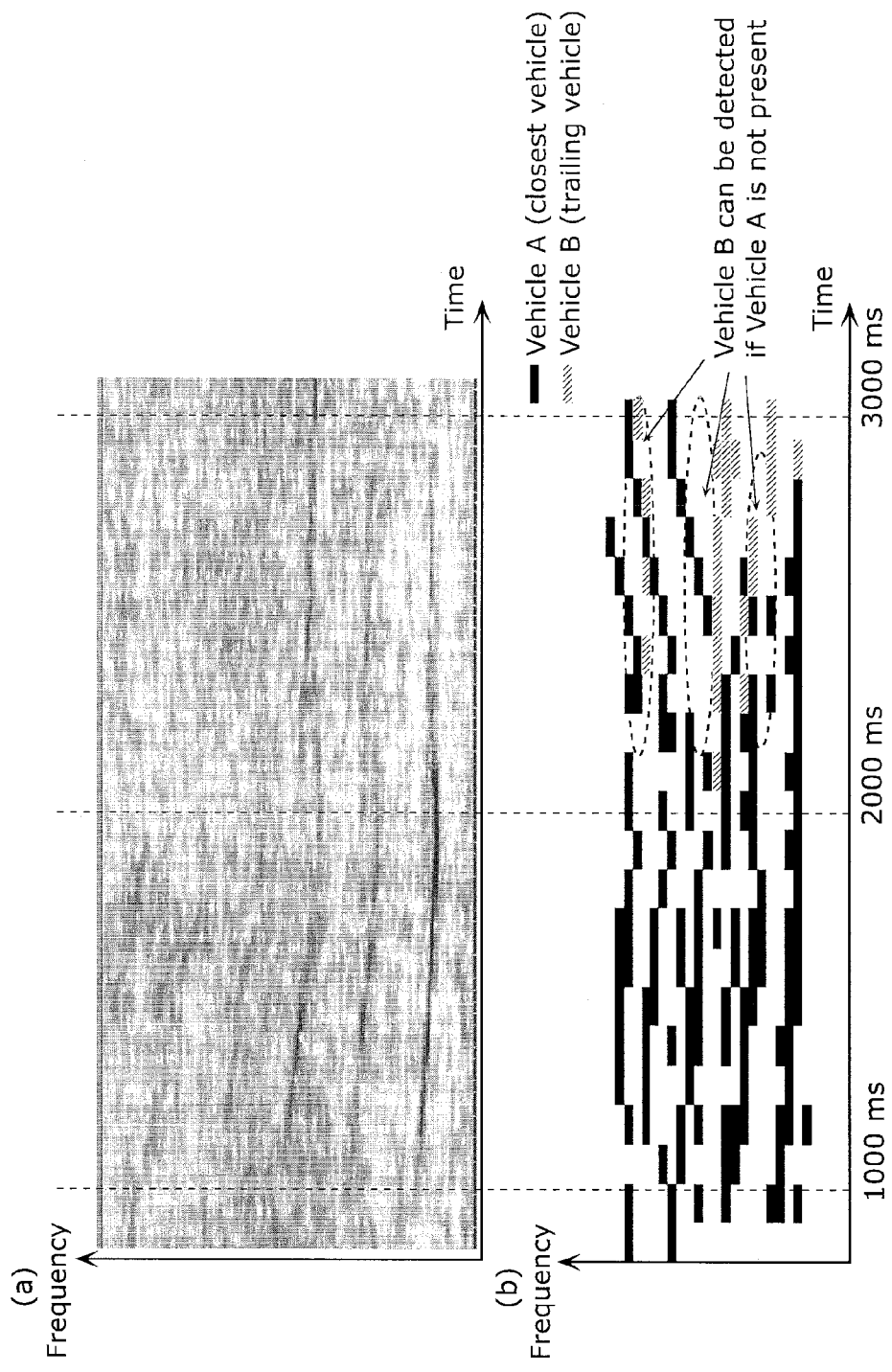

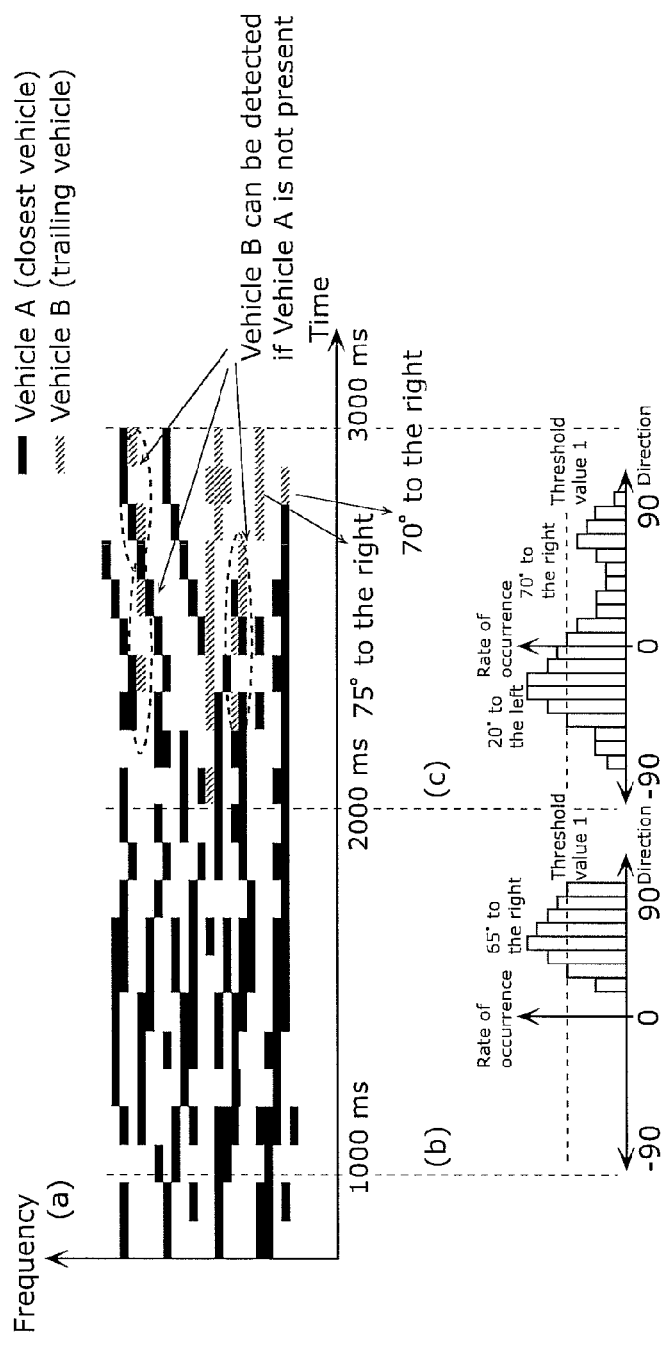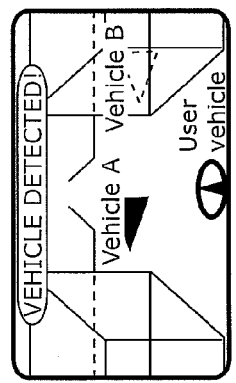

VEHICLE DIRECTION IDENTIFICATION DEVICE, VEHICLE DIRECTION IDENTIFICATION METHOD AND PROGRAM THEREFOR

CROSS REFERENCE TO RELATED APPLICATIONS

This is a continuation application of PCT Patent Application No. PCT/JP2012/000132 filed on Jan. 11, 2012, designating the United States of America, which is based on and claims priority of Japanese Patent Application No. 2011-008115 filed on Jan. 18, 2011. The entire disclosures of the above-identified applications, including the specifications, drawings and claims are incorporated herein by reference in their entirety.

TECHNICAL FIELD

One or more exemplary embodiments disclosed herein relate generally to vehicle direction identification devices which identify a direction in which a vehicle is present from vehicle sound, and particularly to a vehicle direction identification device which accurately identifies a direction in which a vehicle is present even when vehicle sound from an other vehicle is obscured by vehicle sound from a nearby vehicle in an environment in which a plurality of vehicles are passing by.

BACKGROUND ART

One known conventional technique includes identifying a direction in which a vehicle is present using vehicle sound arrival time difference (see Patent Literature (PTL) 1 and Non Patent Literature (NPL) 1, for example).

CITATION LIST

Patent Literature

[PTL 1] Japanese Unexamined Utility Model (Registration) Application Publication No. 5-92767

Non Patent Literature

[NPL 1] Hoshino, Hiroyuki. 2006. Approaching vehicles detection system by using vehicle noise for driver support (Doraiba Shien No Tame No Soko-on Ni Yoru Sekkin Sharyo Kenchi Shisutemu). *The Journal of the Acoustical Society of Japan* vol. 62, no. 3: 265-274

SUMMARY OF INVENTION

Technical Problem

However, there is difficulty in detecting vehicle sound in an environment that includes a plurality of vehicles with conventional techniques in vehicle sound detection due to the sound of a nearby vehicle obscuring the sound of another vehicle (NPL 1, p. 271).

Specifically, when identifying a direction in which a vehicle is present in an environment that includes a plurality of vehicles (for example two vehicles), if neither a second vehicle nor the direction thereof can be detected after a direction in which a first vehicle is present is identified, a driver cannot enter an intersection after the first vehicle has passed with peace of mind. As a result, the possibility of the undetected vehicle and the vehicle being driven by the driver colliding is high. It is therefore necessary to accurately detect a plurality of vehicles and the directions in which the vehicles are positioned in order to avoid a vehicle accident.

One non-limiting and exemplary embodiment provides a vehicle direction identification device and such specifically capable of identifying directions in which each and every car is present, even when vehicle sound from an other vehicle is obscured by vehicle sound from a closer vehicle.

Solution to Problem

In one general aspect, the techniques disclosed in here feature a vehicle direction identification device which identifies a direction in which each of a plurality of vehicles including a first vehicle and a second vehicle is present from surrounding sound that is detected by a plurality of microphones and includes vehicle sound originating from the plurality of vehicles, the vehicle direction identification device including: a frequency analysis unit configured to analyze at least one of amplitude and phase of the surrounding sound in each of a plurality of analysis sections specified by predetermined frequency bands and predetermined time intervals; a sound source direction identification unit configured to identify, based on a result of the analysis obtained from the frequency analysis unit, a sound source direction for each of the plurality of analysis sections, the sound source direction indicating a direction from which a sound included in the surrounding sound originates; a vehicle identification information storage unit configured to store first vehicle identification information which includes a first threshold value for identifying a direction in which the first vehicle is present; a first vehicle identification unit configured to calculate rates of occurrence for respective sound source directions included in the sound source direction, and identify, as a direction in which the first vehicle is present, one or more of the sound source directions for which a corresponding one or more of the rates of occurrence calculated is greater than or equal to the first threshold value included in the first vehicle identification information, the rates of occurrence each being a count of one or more of the plurality of analysis sections of a corresponding one of the sound source directions; a second vehicle identification information calculation unit configured to calculate second vehicle identification information which (i) includes a second threshold value that is lower than the first threshold value and (ii) is for identifying a direction in which the second vehicle is present; and a second vehicle identification unit configured to identify, as a direction in which the second vehicle is present, one or more of the sound source directions for which a corresponding one or more of the rates of occurrence calculated is greater than or equal to the second threshold value included in the second vehicle identification information, wherein the second vehicle identification information calculation unit is configured to calculate the second threshold value so that the second threshold value is smaller as a total value of the rates of occurrence for the one or more of the sound source directions corresponding to the direction identified as the direction in which the first vehicle is present increases.

According to this configuration, the vehicle direction identification device first identifies a direction in which the first vehicle is present from the identified sound source direction. Next, the vehicle direction identification device calculates, based on the vehicle sound from the identified the first vehicle, information such as a threshold value and a direction for identifying the second vehicle. Here, when the ratio of the vehicle sound from the identified the first vehicle relative to the surrounding sound is relatively large, it can be assumed that the vehicle sound from the second vehicle will become relatively quieter. Conversely, when the ratio of the vehicle sound from the first vehicle relative to the surrounding sound is relatively small, it can be assumed that the vehicle sound from the second vehicle will become relatively louder. Therefore, a suitable threshold value can be set as a result of the vehicle direction identification device calculating, based on the vehicle sound from the first vehicle, a threshold value for identifying the second vehicle. As a result, directions in which each and every car is present can be identified, even when vehicle sound from an other vehicle is obscured by vehicle sound from a closer vehicle. These general and specific aspects may be implemented using a system, a method, an integrated circuit, a computer program, or a computer-readable recording medium such as a CD-ROM, or any combination of systems, methods, integrated circuits, computer programs, or computer-readable recording media. Specifically, the present disclosure can not only be implemented as a vehicle direction identification device including characterizing processing units such as those described here, but as a method of vehicle direction identification in which the characterizing processing units included in the vehicle direction identification device are implemented as steps in a process, or a computer program for causing a computer to execute the characterizing steps included in the method of vehicle direction identification. Moreover, it goes without saying that the computer program can be circulated on storage media such as a compact disc-read only memory (CD-ROM) or over a communications network such as the Internet.

Furthermore, the vehicle direction identification device or a portion of the vehicle direction identification device can be realized as a semiconductor integrated circuit (LSI), or as a vehicle direction identification system which includes the vehicle direction identification device.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects of Invention

One or more exemplary embodiments or features disclosed herein provide a vehicle direction identification device which can identify directions in which each and every car is present, specifically even when vehicle sound from an other vehicle is obscured by vehicle sound from a closer vehicle.

BRIEF DESCRIPTION OF DRAWINGS

These and other advantages and features of exemplary embodiments of the present disclosure will become apparent from the following description thereof taken in conjunction with the accompanying Drawings, by way of non-limiting examples of embodiments of the present disclosure. In the Drawings:

FIG. 5 shows sound source directions of predetermined analysis sections according to the first and second embodiments;

FIG. 8 shows a second drawing explaining sound source directions of predetermined analysis sections according to the first and second embodiments;

FIG. 9A shows a first drawing illustrating a challenge faced in identifying a vehicle according to the first and second embodiments;

FIG. 9B shows a second drawing illustrating a challenge faced in identifying a vehicle according to the first and second embodiments;

DESCRIPTION OF EMBODIMENTS

Figure 1:
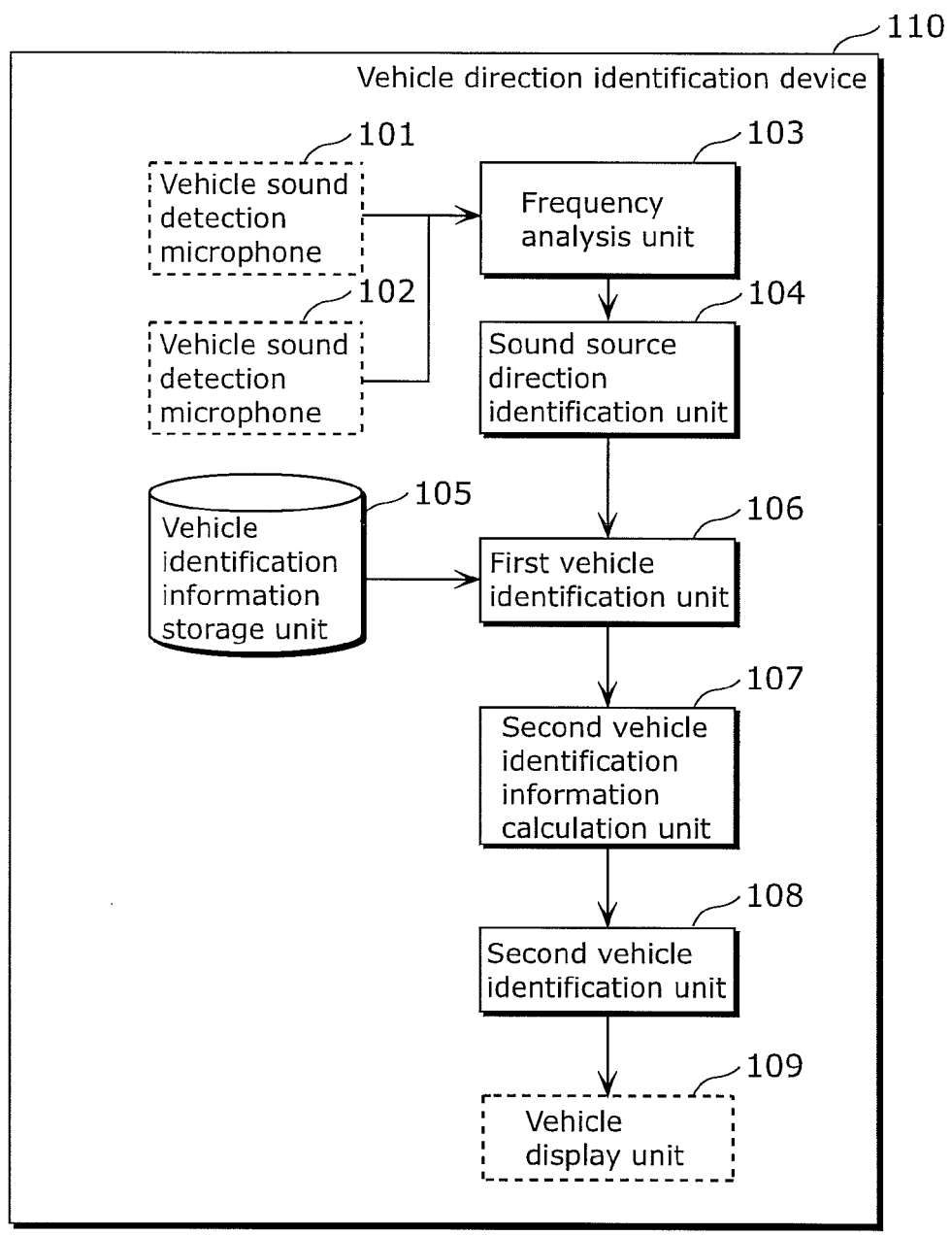
FIG. 1 is a block diagram showing a configuration of the vehicle direction identification device according to the first embodiment.

According to an exemplary embodiment described herein, a vehicle direction identification device identifies a direction in which each of a plurality of vehicles including a first vehicle and a second vehicle is present from surrounding sound that is detected by a plurality of microphones and includes vehicle sound originating from the plurality of vehicles, and includes: a frequency analysis unit configured to analyze at least one of amplitude and phase of the surrounding sound in each of a plurality of analysis sections specified by predetermined frequency bands and predetermined time intervals; a sound source direction identification unit configured to identify, based on a result of the analysis obtained from the frequency analysis unit, a sound source direction for each of the plurality of analysis sections, the sound source direction indicating a direction from which a sound included in the surrounding sound originates; a vehicle identification information storage unit configured to store first vehicle identification information which includes a first threshold value for identifying a direction in which the first vehicle is present; a first vehicle identification unit configured to calculate rates of occurrence for respective sound source directions included in the sound source direction, and identify, as a direction in which the first vehicle is present, one or more of the sound source directions for which a corresponding one or more of the rates of occurrence calculated is greater than or equal to the first threshold value included in the first vehicle identification information, the rates of occurrence each being a count of one or more of the plurality of analysis sections of a corresponding one of the sound source directions; a second vehicle identification information calculation unit configured to calculate second vehicle identification information which (i) includes a second threshold value that is lower than the first threshold value and (ii) is for identifying a direction in which the second vehicle is present; and a second vehicle identification unit configured to identify, as a direction in which the second vehicle is present, one or more of the sound source directions for which a corresponding one or more of the rates of occurrence calculated is greater than or equal to the second threshold value included in the second vehicle identification information, wherein the second vehicle identification information calculation unit is configured to calculate the second threshold value so that the second threshold value is smaller as a total value of the rates of occurrence for the one or more of the sound source directions corresponding to the direction identified as the direction in which the first vehicle is present increases.

In this way, the vehicle direction identification device first identifies a direction in which the first vehicle is present from the identified sound source direction. Next, the vehicle direction identification device calculates, based on the vehicle sound from the identified the first vehicle, information such as a threshold value and a direction for identifying the second vehicle. Here, when the ratio of the vehicle sound from the identified the first vehicle relative to the surrounding sound is relatively large, it can be assumed that the vehicle sound from the second vehicle will become relatively quieter. Conversely, when the ratio of the vehicle sound from the first vehicle relative to the surrounding sound is relatively small, it can be assumed that the vehicle sound from the second vehicle will become relatively louder. Therefore, a suitable threshold value can be set as a result of the vehicle direction identification device calculating, based on the vehicle sound from the first vehicle, a threshold value for identifying the second vehicle. As a result, directions in which each and every car is present can be identified, even when vehicle sound from an other vehicle is obscured by vehicle sound from a closer vehicle.

Specifically, the sound source direction identification unit may be configured to identify, for each of the plurality of analysis sections, an angle as the sound source direction, the angle corresponding to a difference in arrival time of the surrounding sound between the plurality of microphones.

Moreover, a travel direction identification unit is further included and may be configured to identify a direction of travel of the first vehicle from a change over time in the direction in which the first vehicle is positioned as identified by the first vehicle identification unit, wherein the second vehicle identification information calculation unit is configured to (i) calculate, from among a plurality of the sound source directions included in the sound source direction identified by the sound source direction identification unit, as a second vehicle search range, a plurality of sound source directions included in a direction that is opposite the direction of travel of the first vehicle, excluding the sound source direction that corresponds to the direction identified as the direction in which the first vehicle is present, and (ii) calculate the second vehicle identification information which includes the second vehicle search range.

In this way, a search angle for the second vehicle that follows the first vehicle can be narrowed down with the use of vehicle direction of travel. Accordingly, the direction in which the second vehicle is present can be identified with a higher degree of accuracy.

Specifically, the first vehicle identification unit may be configured to identify, for each of a plurality of predetermined time periods, the direction in which the first vehicle is present from surrounding sound detected in one of the predetermined time periods, and the travel direction identification unit may be configured to identify, as the direction of travel of the first vehicle, a direction from the previously identified direction in which the first vehicle was present towards the currently identified direction in which the first vehicle is present.

Moreover, the second vehicle identification unit may be configured to identify the direction in which the second vehicle is present from the plurality of sound source directions included in the second vehicle search range.

Moreover, at least one of the first threshold value and the second threshold value may be different for each of the predetermined frequency bands.

Generally, the rate of occurrence increases the higher the frequency of a sound is (for example, tire sound), and decreases the lower the frequency of a sound is (for example, engine sound). Accordingly, vehicles can be identified with a higher degree of accuracy by increasing the threshold value as the frequency increases.

Specifically, the first threshold value may include a plurality of frequency bands and a plurality of frequency-specific threshold values associated with the plurality of frequency bands in a one-to-one relationship, the plurality of frequency-specific threshold values being set to increase as an associated one of the plurality of frequency bands increases, and the first vehicle identification unit may be configured to, for each analysis region, calculate the rates of occurrence for the respective sound source directions, and identify, as the direction in which the first vehicle is present, one or more of the sound source directions for which a corresponding one or more of the rates of occurrence calculated is greater than or equal to one of the plurality of frequency-specific threshold values that is associated with one of the plurality of frequency bands in which the analysis region is included, the analysis region being a collection of the plurality of analysis sections in each of the plurality of frequency bands from among the plurality of analysis sections, and the plurality of frequency-specific threshold values being included in the first threshold value.

Moreover, the second vehicle identification information calculation unit may be configured to set the second threshold value for the one or more of the sound source directions corresponding to the direction identified as the direction in which the first vehicle is present to the same value as the first threshold value, and set the second threshold value for other the sound source directions to a value calculated to decrease as a ratio increases, the ratio being of a total value of the rates of occurrence of a plurality of sound source directions included in the sound source direction to a total value of the rates of occurrence of the one or more of the sound source directions corresponding to the direction identified as the direction in which the first vehicle is present.

Moreover, the second vehicle identification unit may be configured to identify the direction in which the second vehicle is present from the plurality of sound source directions other than the one or more of the sound source directions corresponding to the direction identified as the direction in which the first vehicle is present.

Moreover, the second vehicle identification information calculation unit may be configured to, for each analysis region, calculate the second threshold value so that the second threshold value is smaller as (i) a ratio of a total value of the rates of occurrence of all of the sound source directions to a total value of the rates of occurrence for the one or more of the sound source directions corresponding to the direction identified as the direction in which the first vehicle is present increases, and as (ii) a frequency corresponding to the analysis region decreases, the analysis region being a collection of the plurality of analysis sections in each of the plurality of predetermined frequency bands.

In this way, the accuracy of sound source direction identification is further increased by setting a threshold value while taking into consideration differences in rate of occurrence depending on frequency.

Moreover, at least one of the first vehicle identification unit and the second vehicle identification information calculation unit may be configured to assign greater weight to an analysis section among the plurality of analysis sections having a higher degree of similarity to adjacent ones of the plurality of analysis sections with respect to the respective sound source directions, and calculate the rates of occurrence for the respective sound source directions as a count of the weighted plurality of analysis sections in a corresponding one of the sound source directions.

In this way, a decrease in vehicle direction identification accuracy resulting from a variation in sound source direction can be prevented by keeping influence from instantaneous and random noises such as wind noise to a minimum.

Moreover, the first vehicle identification information may include a plurality of sound pressure-specific threshold values which are threshold values associated with a plurality of analysis regions in a one-to-one relationship, the plurality of analysis regions each being a collection of the plurality of analysis sections included in each of a plurality of frequency bands, and the first vehicle identification unit may be configured to not use one of the plurality of analysis regions for identification of the direction in which the first vehicle is present when an average amplitude value of the plurality of analysis sections included the one of the plurality of analysis regions is less than the sound pressure-specific threshold value associated with the frequency band corresponding to the one of the plurality of analysis regions from which the average amplitude value is calculated.

Generally, noise tends to have a low level of amplitude. As such, a direction in which a vehicle is present can be identified with increased accuracy by screening for sounds intended for analysis by level of amplitude.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, structural elements, the arrangement and connection of the structural elements, steps, the processing order of the steps etc. shown in the following exemplary embodiments are mere examples, and therefore do not limit the inventive concept, the scope of which is defined in the appended Claims and their equivalents. Therefore, among the structural elements in the following exemplary embodiments, structural elements not recited in any one of the independent claims defining the most generic part of the inventive concept are described as arbitrary structural elements.

Embodiment 1

The vehicle direction identification device according to the first embodiment will be described. FIG. 1 shows a configuration of the vehicle direction identification device according to the first embodiment of the present disclosure.

A vehicle direction identification device 110 detects a direction in which a vehicle is present from vehicle sound from a plurality of vehicles near the user vehicle. More specifically, the vehicle direction identification device 110 identifies a direction in which each of a plurality of vehicles including a first vehicle and a second vehicle are present from surrounding sound that is detected by a plurality of microphones and includes vehicle sound originating from the plurality of vehicles.

As shown in FIG. 1, the vehicle direction identification device 110 includes a vehicle sound detection microphone 101 and 102, a frequency analysis unit 103, a sound source direction identification unit 104, a vehicle identification information storage unit 105, a first vehicle identification unit 106, a second vehicle identification information calculation unit 107, a second vehicle identification unit 108, and a vehicle display unit 109.

Figure 2:
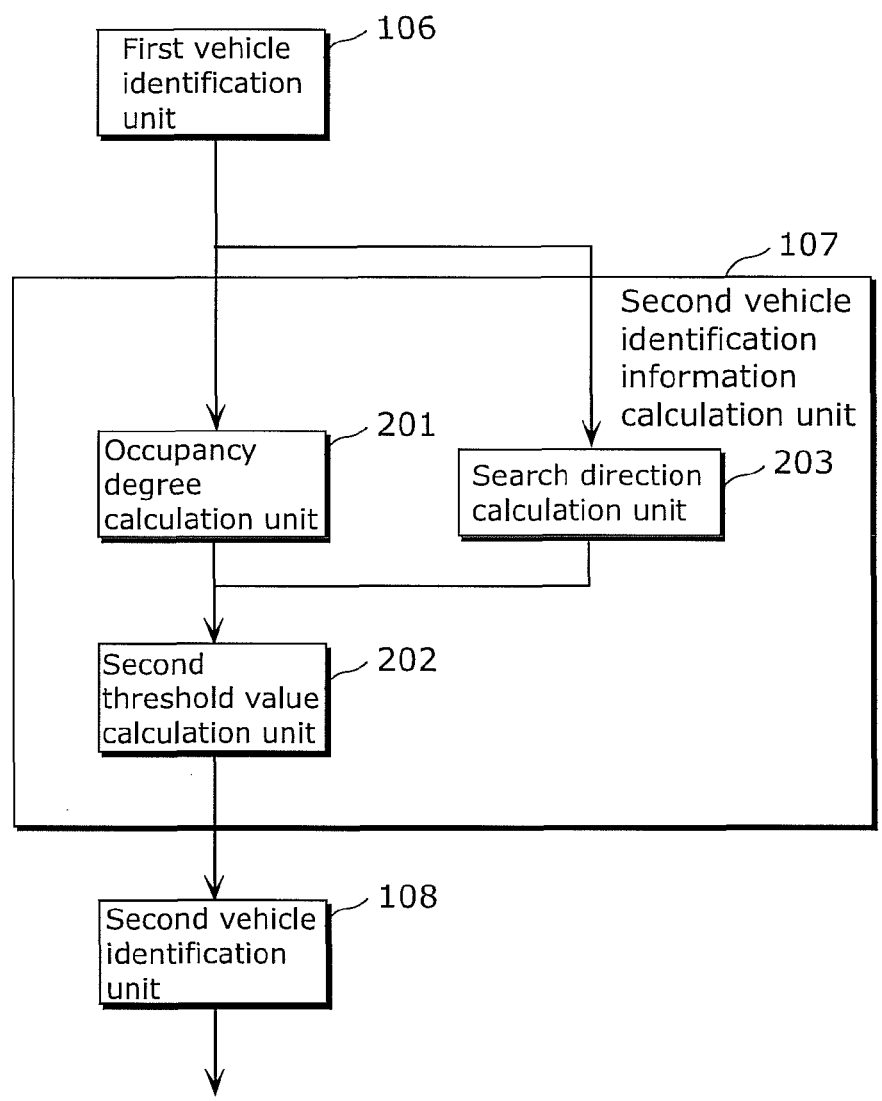
FIG. 2 is a block diagram showing a configuration of the second vehicle identification information calculation unit according to the first embodiment.

Furthermore, as shown in FIG. 2, the second vehicle identification information calculation unit 107 includes an occupancy degree calculation unit 201, a second threshold value calculation unit 202, and a search direction calculation unit 203.

The vehicle sound detection microphone 101 and 102 each detect surrounding sound which includes vehicle sound from a plurality of vehicles, including vehicle engine sound, motor sound, and driving sound, for example.

The vehicle sound detection microphone 101 and 102 are fitted, for example, to the front bumper of the vehicle on the left and right. It is to be noted that the vehicle sound detection microphone 101 and 102 may be installed in a different location where detection of vehicle sound is possible, such as on the side mirrors, on the roof, or under the hood of the vehicle. For example, the speakers should be oriented facing a direction that is orthogonal to the direction of travel of the vehicle and positioned as far apart as possible. This will allow the sound source direction identification unit (to be described later) to identify the sound source direction with increased accuracy.

The frequency analysis unit 103 analyzes at least one of amplitude and phase of the surrounding sound in each of the analysis sections specified by predetermined frequency bands and predetermined time intervals; That is, the frequency analysis unit 103 analyzes the frequency of the sound information obtained by the vehicle sound detection microphone 101 and 102. More specifically, the frequency analysis unit 103 processes the sound information using a Fourier transform process to obtain the frequency signal, amplitude, and phase of the sound. It is to be noted that the frequency analysis unit 103 may perform a frequency conversion process by a frequency conversion method other than Fourier transform, such as fast Fourier transform, discrete cosine transform, or wavelet transform.

The sound source direction identification unit 104 identifies, based on a result of the analysis obtained from the frequency analysis unit, a sound source direction for each of the plurality of analysis sections, the sound source direction indicating a direction from which a sound included in the surrounding sound originates.

Hereinafter, principles for the identification of a sound source direction by the sound source direction identification unit 104 are discussed with reference to FIG. 3 and FIG. 4.

Figure 3:
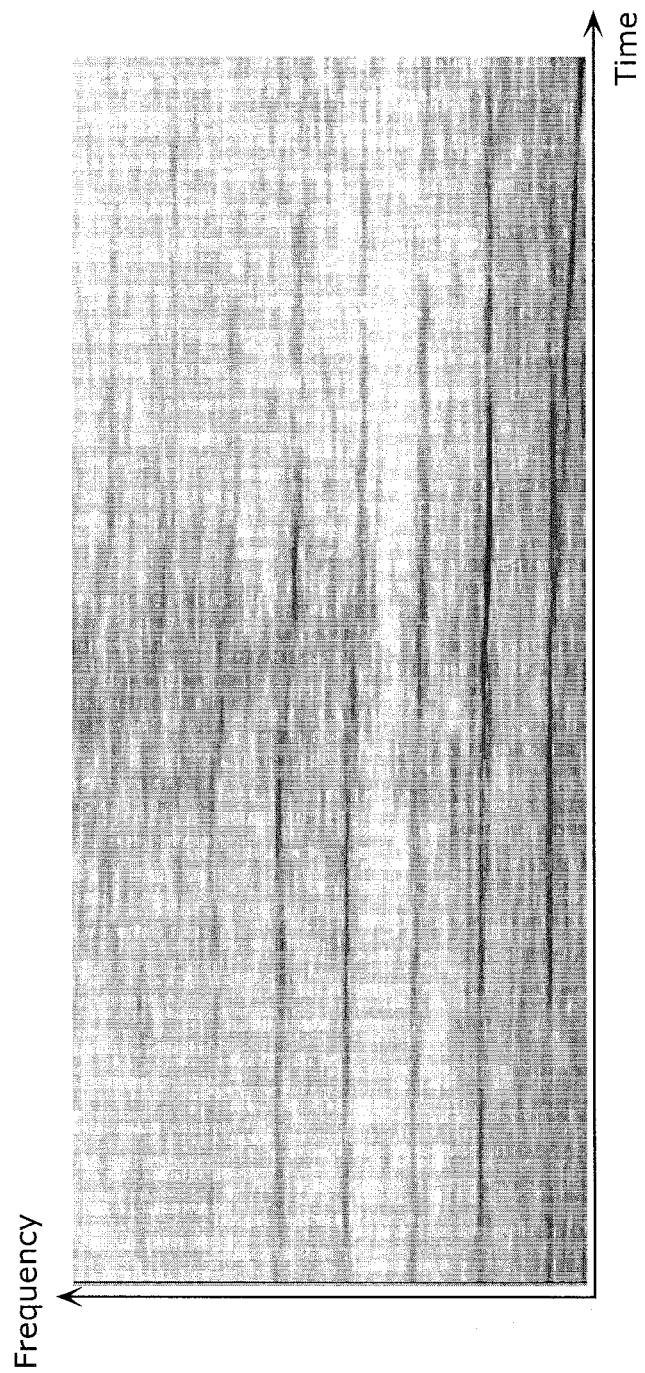
FIG. 3 shows a result of a frequency analysis of engine sound from an actual vehicle detected by a vehicle sound detection microphone.

FIG. 3 is a spectrogram which shows a result of a frequency analysis of engine sound from an actual vehicle detected by the vehicle sound detection microphone 101 and 102. The vertical axis represents frequency, and the horizontal axis represents time. The darkness represents the power of the frequency signal, where the darker regions are the more powerful regions. Since vehicle sound is sound emanating from the engine vibrating rhythmically, the sound has a specific frequency component, similar to a sine wave. Furthermore, the frequency characteristics of vehicle sound, such as harmonic or half harmonic, differ depending on the vehicle.

It is to be noted that the vehicle sound detection microphone 101 and 102 also detect noise such as wind noise. The sound source direction identification unit 104 therefore, for example, establishes a threshold value for amplitude and from the surrounding sound extracts only sound having a level of amplitude greater than or equal to the threshold value as vehicle sound for sound source direction identification. The sound source direction identification unit 104 may also remove noise from the surrounding sound by spectral subtraction, for example, and use the remaining sound as vehicle sound for sound source direction identification.

Figure 4:
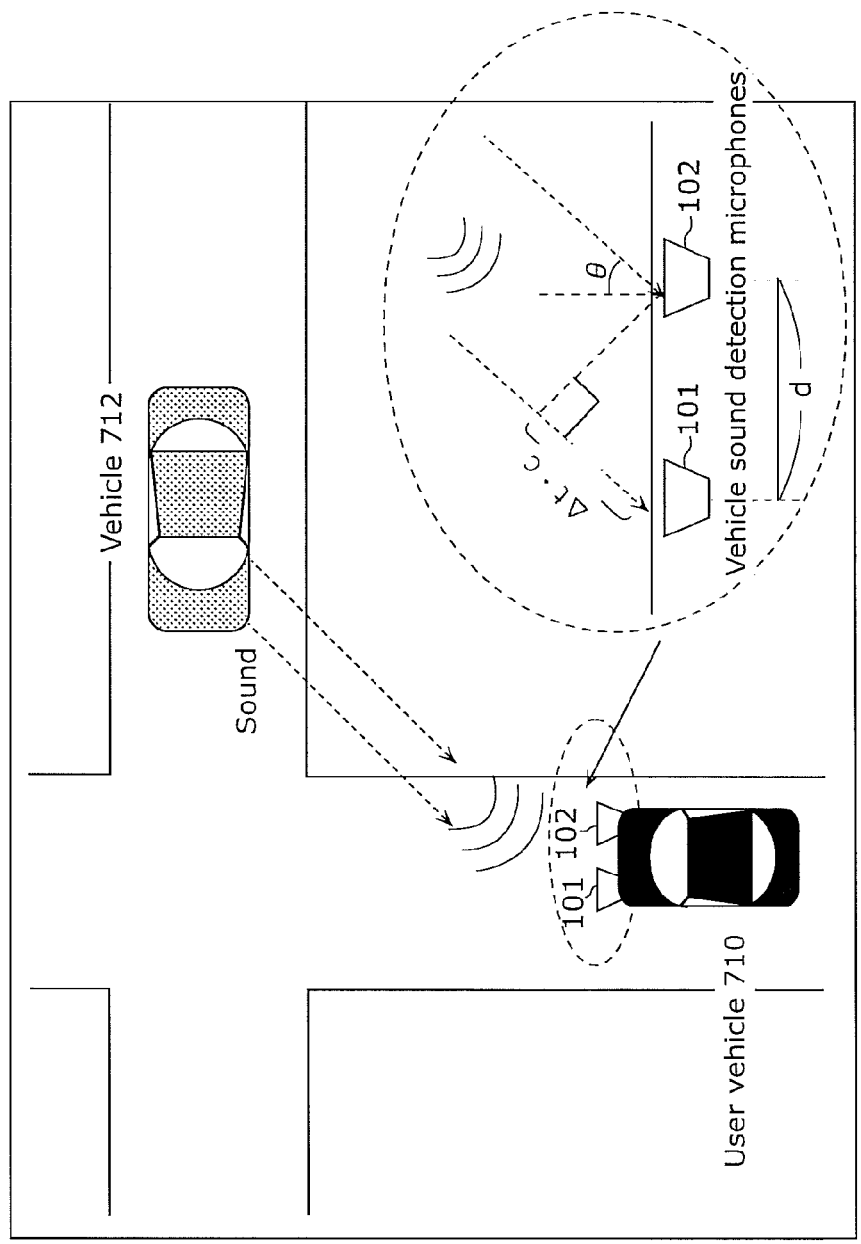
FIG. 4 shows a method of identifying a sound source direction for each analysis section used by the sound source direction identification unit according to the first and second embodiments.

FIG. 4 shows a method of identifying the sound source direction for each analysis section used by the sound source direction identification unit 104.

As shown in FIG. 4, the vehicle sound detection microphone 101 and 102 are fitted to the bumper of a user vehicle 710 The time it takes for the vehicle sound to reach each of the microphones differs depending on the direction in which a vehicle 712 is present relative to the direction of travel of the user vehicle 710.

Here, the distance between the positions of the vehicle sound detection microphone 101 and 102 is expressed as d (m). Moreover, the vehicle 712 is detected from the direction θ (radian) relative to the direction of travel of the user vehicle 710. Furthermore, arrival time difference, which is the difference in time it takes for the same vehicle sound to reach the vehicle sound detection microphone 101 and the vehicle sound detection microphone 102, is expressed as Δt (s), and speed of sound is expressed as c (m/s). The direction θ (radian) can be calculated for with Equation 1 shown below.

[Math 1]

$$\theta = \sin^{-1}(\Delta t c/d) \qquad \text{(Equation 1)}$$

Consequently, the sound source direction identification unit 104 can, for each analysis section, identify the sound source direction from the above-noted Equation 1 by obtaining the phase difference, which corresponds to the arrival time difference, of the same sound included in the surrounding sound detected by the vehicle sound detection microphone 101 and the vehicle sound detection microphone 102.

It is to be noted that the sound source direction identification unit 104 may identify a sound source direction by using the difference in amplitude of the same sound, or both phase difference and amplitude instead of arrival time difference of the same sound (that is, phase difference).

For example, when the amplitude attenuation rate AL of a sound traveling a distance x through space is calculated for with the equation $\Delta L = f(x)$, θ shown in FIG. 4 can be calculated for with the equation $\theta = \sin^{-1}(f^{-1}(\Delta L)/d)$. Here, when the difference in amplitude between the vehicle sound detection microphone 101 and the vehicle sound detection microphone 102 is expressed as ΔL, the sound source direction identification unit 104 can identify the sound source direction.

FIG. 5 shows sound source direction according to the first embodiment.

Specifically, (a) in FIG. 5 shows a result of the sound source direction identification unit 104 identifying a direction for each analysis section in which the vehicle 712 is present.

In (a) in FIG. 5, the vertical axis represents frequency, and the horizontal axis represents time. As shown in the enlarged view of a region 720, frequency and time are divided into predetermined frequency bands and predetermined time intervals thereby defining a plurality of analysis sections. Here, the analysis section colored black in (a) in FIG. 5 represents an analysis section for which a direction of sound has been identified by the sound source direction identification unit 104.

The analysis sections are set, for example, in 5 Hz increments with respect to frequency band and in 100 ms increments with respect to time.

For example, the sound source direction of an analysis section 1071 is identified as 80 degrees to the right with respect to the user vehicle (here, the front of the user vehicle is 0 degrees, where positive values are to the right of the front of the user vehicle and negative values are to the left of the front of the user vehicle). Moreover, the sound source direction of an analysis section 1072 is identified as 85 degrees to the right with respect to the user vehicle. In this way, the sound source direction identification unit 104 identifies the sound source direction for each analysis section. It is to be noted that the analysis sections which are not colored black are analysis sections for which a sound source direction could not be identified by the sound source direction identification unit 104.

The vehicle identification information storage unit 105 stores vehicle identification information (first vehicle identification information) which is information for identifying whether a detected sound originates from a vehicle or not (that is, information which includes a threshold value for identifying a direction in which a vehicle is present).

Figures 6A, 6B, 7:
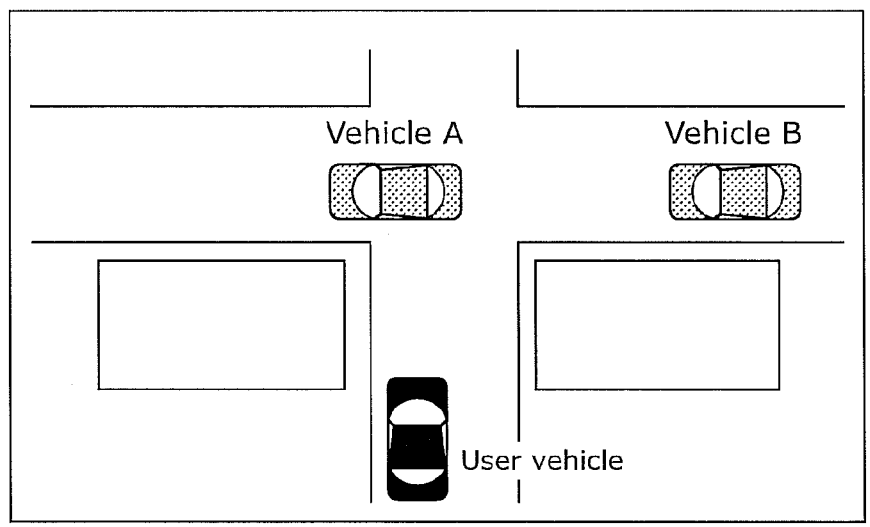
FIG. 6A shows an example of vehicle identification information according to the first and second embodiments.
FIG. 6B shows another example of vehicle identification information according to the first and second embodiments.
FIG. 7 shows an example of positions of a plurality of vehicles.

FIG. 6A and FIG. 6B show an example of the vehicle identification information according to the first embodiment.

FIG. 6A shows the vehicle identification information. A threshold value of the rate of occurrence is stored in the vehicle identification information as information for identifying, for example, whether a detected sound originates from a vehicle or not. Even if the direction of the origin of the sound is identified, there is a possibility that the sound is noise or some other kind of sound. However, with the establishment of a threshold value, it becomes possible to identify vehicles with accuracy by identifying sound which exceeds or is equal to the threshold value as vehicle sound.

Furthermore, the vehicle identification information storage unit 105 may have a threshold value which varies with the frequency band used.

FIG. 6B is another example of the vehicle identification information. Particularly in the case of vehicle sound, engine sound generally appears in the low frequency band, such as within the 50 Hz to 350 Hz range. Furthermore, engine sound has a harmonic structure. On the other hand, tire sound appears in the high frequency band, such as within the 700 Hz to 1000 Hz range. Tire sound generally appears throughout the frequency. It therefore becomes possible to identify vehicle sound with accuracy by varying the threshold value according to the frequency band. Moreover, the sound pressure of engine sound and tire sound are different, and the distance at which engine sound and tire sound can be detected is different. Consequently, it is acceptable to individually establish sound pressure threshold values for engine sound and tire sound. This is because the rate of occurrence of tire sound tends to be greater than engine sound, making it necessary to raise the threshold value thereof.

That is, the threshold value includes a plurality of frequency bands and frequency-specific threshold values each of which are associated with one of the frequency bands. Moreover, the higher the frequency band, the higher the associated frequency-specific threshold value is set to be. The threshold value may furthermore include sound pressure-specific threshold values each of which are associated with one of the frequency bands.

Once again referring to FIG. 1, the first vehicle identification unit 106 calculates the rate of occurrence for each of a plurality of sound source directions. Here, the rate of occurrence is a count of one or more of the analysis sections of a corresponding one of the sound source directions. Moreover, the first vehicle identification unit 106 identifies, as a direction in which the first vehicle is present, one or more of the sound source directions for which a corresponding one or more of the rates of occurrence calculated is greater than or equal to the first threshold value included in the first vehicle identification information.

Specifically, the first vehicle identification unit 106 calculates, for each predetermined interval of time (for example, 300 ms), the rate of occurrence for each of the sound source directions included in the surrounding sound obtained by the vehicle sound detection microphone 101 and 102 within the predetermined interval of time.

For example, (b) in FIG. 5 shows a rate of occurrence distribution 1081 which is a distribution of the rate of occurrence of the sound source directions included in the vehicle sound detected by the vehicle sound detection microphone 101 and 102 between 0 and 500 ms. Here, the horizontal axis represents direction, and the vertical axis represents rate of occurrence. In the case of (b) in FIG. 5, the greatest rate of occurrence is for 80 degrees to the right. Consequently, it can be inferred that the direction in which the source of the sound (the first vehicle) is present during this time interval is 80 degrees to the right. Furthermore, it is possible that the source of the sound is present in a range from 70 degrees to 85 degrees since the rate of occurrence in this range is relatively high. It is to be noted that when the sound source direction is identified using sound arrival time difference, the calculation does not necessarily yield an exact direction, but generally yields a distribution profile representing a range of directions. Consequently, it is acceptable to identify the direction having the highest rate of occurrence as the direction in which the vehicle is present, and it is also acceptable to identify the direction in which the vehicle is present using a predetermined range.

Similarly, (c) in FIG. 5 shows a rate of occurrence distribution 1082 which is a distribution of the rate of occurrence of the sound source directions included in the vehicle sound detected by the vehicle sound detection microphone 101 and 102 between 500 and 1000 ms. The greatest rate of occurrence is for 5 degrees to the left. Consequently, it can be inferred that the direction in which the sound source (the first vehicle) is present during this time interval is 5 degrees to the left.

Furthermore, (d) in FIG. 5 shows a rate of occurrence distribution 1088 which is a distribution of the rate of occurrence of the sound source direction included in the vehicle sound detected by the vehicle sound detection microphone 101 and 102 between 1000 and 1500 ms. The greatest rate of occurrence is for 80 degrees to the left. Consequently, the first vehicle identification unit 106 identifies that the first vehicle is present at 5 degrees to the left during this time interval.

It is to be noted that it can be inferred that the source of the sound (the first vehicle) is moving from right to left by evaluating the direction in which the first vehicle is present over time, from (b) to (c) then (d).

It is to be noted that other values can be used for the frequency bands and the time intervals. In general, the finer the frequency bands and the time intervals are set, the greater one can expect the identification accuracy of the sound source direction to be. However, since susceptibility to noise and error increases if set excessively fine, the frequency bands and the time intervals should be set to around the values noted above.

Here, from (b) to (d) in FIG. 5, the dashed lines, which represents a given rate of occurrence, indicates the threshold value of the rate of occurrence included in the first vehicle identification information. When the rate of occurrence is greater than or equal to the threshold value, the possibility that the sound is vehicle sound is high. As such, the first vehicle identification unit 106 identifies, as the direction in which the first vehicle is present, one or more of the sound source directions for which a corresponding one or more of the rates of occurrence calculated is greater than or equal to the threshold value. On the other hand, the first vehicle identification unit 106 determines that the sound source directions having a rate of occurrence that is under the threshold value to be noise such as wind noise.

It is to be noted that the first vehicle identification unit 106 may identify the direction of the first vehicle using the first vehicle identification information when the information includes threshold values associated with each frequency band.

For example, as previously noted, consider that the first threshold value includes a plurality of frequency bands and frequency-specific threshold values each of which are associated with one of the frequency bands. In this case, the first vehicle identification unit 106 calculates, for each analysis region, the rate of occurrence of each of the sound source directions. An analysis region is a collection of the analysis sections included in each of the frequency bands. Next, one can infer that the first vehicle identification unit 106 will identify, as the direction in which the first vehicle is present, one or of the sound source directions for which a corresponding one or more of the rates of occurrence is greater than or equal to one of the frequency-specific threshold value that is associated with one of the plurality of frequency band in which the analysis region is included.

Moreover, as previously noted, consider that the first vehicle identification information includes threshold values (called sound pressure-specific threshold values) each of which are associated with one of the frequency bands. In this case, when an average amplitude value of the analysis sections included in one of the analysis regions is less than the sound pressure-specific threshold value associated with the frequency band corresponding to the analysis region from which the average amplitude value is calculated, it is acceptable if the first vehicle identification unit 106 does not use that analysis region for the identification of the direction in which the first vehicle is present. Furthermore, a statistic such as the largest amplitude value, the median amplitude value, or some other given representative value may be used instead the average amplitude value.

The second vehicle identification information calculation unit 107 calculates, from, for example, the direction of the vehicle identified by the first vehicle identification unit 106, vehicle identification information (second vehicle identification information) which includes the second threshold value that is lower than the first threshold value and is for identifying the second vehicle.

Hereinafter, challenges faced when identifying a position of a vehicle in a situation in which a plurality of vehicles are present will be described with reference to FIG. 7 through FIG. 9B.

FIG. 7 shows an example of a situation in which a plurality of vehicles are present. The vehicle B is present behind the vehicle A.

FIG. 8 explains sound source directions of predetermined analysis sections. Specifically, (a) in FIG. 8 shows a frequency spectrum of the situation shown in FIG. 7 in which a plurality of vehicles are present. Similar to FIG. 3, the vertical axis represents frequency, and the horizontal axis represents time. Moreover, similar to (a) in FIG. 5, the portions colored black in (b) in FIG. 8 represent the portions for which a sound direction has been identified. Furthermore, the portions colored with black diagonal lines represent the portions for which a vehicle sound direction has been identified by the second vehicle identification unit 108 as vehicle sound from the vehicle B.

As shown in (b) in FIG. 8, vehicle sound originating from the vehicle A is detected between 1000 ms and 2000 ms. As time elapses, it is shown that vehicle sound originating from the vehicle B in addition to the vehicle A is detected between 2000 ms and 3000 ms.

FIG. 9A and FIG. 9B illustrate a challenge faced in identifying a vehicle that the present disclosure overcomes.

More specifically, similar to (b) in FIG. 8, (a) in FIG. 9A shows, on a chart with axes representing frequency and time, analysis sections for which sound source directions have been identified. Direction of travel of the individual vehicles, for example, will be explained using a direction distribution chart.

Moreover, (b) in FIG. 9A shows the rate of occurrence distribution of the sound source directions between 1000 ms and 2000 ms. Here, the horizontal axis represents direction and the vertical axis represents rate of occurrence. As shown in (b) in FIG. 9A, the rate of occurrence is the highest for 65 degrees to the right, and the rate of occurrence is centrally-distributed around 65 degrees to the right. Moreover, the rate of occurrence exceeds the threshold value. Consequently, the previously noted first vehicle identification unit 106 identifies the position of the first vehicle to be around 65 degrees to the right.

Next, (c) in FIG. 9A shows the rate of occurrence distribution of the sound source directions between 2000 ms and 3000 ms, after some time as elapsed. Here, the horizontal axis represents direction and the vertical axis represents rate of occurrence. As shown in (c) in FIG. 9A, the vehicle sound originating from the first vehicle (the vehicle A shown in FIG. 7) is centrally-distributed around 20 degrees to the left (−20 degrees). Moreover, because the rate of occurrence exceeds the threshold value, the first vehicle identification unit 106 identifies the position of the first vehicle to be around 20 degrees to the left. Furthermore, it can be inferred that the vehicle A is traveling from right to left by looking at the passage of time from (b) to (c) in FIG. 9A.

Furthermore, as shown in (a) in FIG. 9A, the vehicle B (portions colored with diagonal black slashes) is present in a direction of 70 or 75 degrees to the right between 2000 ms and 3000 ms. According to the rate of occurrence distribution, as shown in (c) of FIG. 9A, there is a peak in the rate of occurrence around 70 degrees to the right. This peak is caused by the vehicle sound from the vehicle B. However, due to the peak in the distribution centered around 70 degrees to the right being lower than the threshold value included in the vehicle identification information, the peak will not be identified as vehicle sound.

In the technical field of vehicle detection using vehicle sound, it is extremely difficult to detect a plurality of vehicles in a situation such as this in which a plurality of vehicles are present. This is because vehicle sound from a vehicle close to the user vehicle (for example vehicle A in the first embodiment) obscures vehicle sound from vehicles further away (for example vehicle B in the first embodiment). It is also difficult to detect a plurality of vehicles when identifying vehicles using a rate of occurrence calculated on the basis of a predetermined frequency and period of time, even if a far away vehicle is detected and a vehicle direction is calculated for the vehicle, because the sound will be obscured due to a difference in the rate of occurrence.

The portions surrounded by the dashed-line ovals in the period of time between 2000 ms and 3000 ms in (a) in FIG. 9A are areas where vehicle sound from the vehicle B should be detected. Here, if only one vehicle, the vehicle B, were present, vehicle sound in these areas would be detected and the direction would be calculated for. However, because the vehicle A is present, the vehicle sound from the vehicle B is obscured by the vehicle sound from the vehicle A, and the vehicle sound from the vehicle B cannot be detected. Moreover, even if detected as vehicle sound, a vehicle will not be identified because the rate of occurrence is too low. In (c) in FIG. 9A, a variety of directions ranging from 20 degrees to the left to 70 degrees to the right are detected. Among these directions are deviated directions detected as a result of the sound from the vehicle A affecting the sound from vehicle B.

In this way, it is extremely difficult to detect the presence of each vehicle in the technical field of vehicle detection using vehicle sound in a situation such as this in which a plurality of vehicles are present.

There is a possibility that a risk of collision could exist, for instance, if a user were notified of the presence of the vehicles under this situation as is. FIG. 9B is a supposition of a situation in which a user is visually notified of the presence of vehicles under this situation. Here, the vehicle A is detected as the user vehicle is approaching the traffic intersection. As a result of the vehicle A being near the user vehicle, the vehicle sound from the vehicle A is relatively well detected, and the direction in which the vehicle A is present in is detected. However, there is also the vehicle B trailing the vehicle A. As previously noted, the vehicle sound from the vehicle B is obscured by the vehicle sound from the vehicle A, causing the vehicle B to go undetected. Alternatively, the direction of detection is affected by the vehicle A due to the phases being mixed, causing the vehicle B to go undetected. Although the vehicle B is represented by dashed lines in FIG. 9B, the vehicle is not visible to the user due to the fact that it is not actually detected.

Under these conditions, there is a possibility that the user will assume that only the vehicle A is approaching and enter the traffic intersection after the vehicle A passes under the pretense that it is safe to do so. In this case, a risk of collision with the vehicle B trailing the vehicle A exists. Consequently, a technique for detecting the presence of the vehicle B when a plurality of vehicles are present is essential.

The second vehicle identification information calculation unit 107 calculates information (second vehicle identification information) for identifying the second vehicle using information relating to a vehicle detected by the first vehicle identification unit 106. Specifically, the second vehicle identification information calculation unit 107 calculates the second vehicle identification information which includes the second threshold value which is calculated to decrease as the ratio of a total value of the rates of occurrence of a plurality of the sound source directions to the rates of occurrence of the one or more sound source directions corresponding to the direction identified as the direction in which the first vehicle is present increases. That is, the second vehicle identification information calculation unit calculates the second threshold value so that the second threshold value is smaller as a total value of the rates of occurrence for the one or more sound source directions corresponding to the direction identified as the direction in which the first vehicle is present increases.

This will be discussed in further detail below.

As shown in FIG. 2, the second vehicle identification information calculation unit 107 according to the first embodiment is configured of the occupancy degree calculation unit 201, the second threshold value calculation unit 202, and the search direction calculation unit 203.

The occupancy degree calculation unit 201 calculates a degree of occupancy of an identified vehicle (the first vehicle). It is to be noted that details regarding the degree of occupancy will be discussed later.

The second threshold value calculation unit 202 calculates the second threshold value which is a threshold value of the rate of occurrence for detecting the second vehicle. The search direction calculation unit 203 calculates a search direction for the second vehicle based on the direction in which the first vehicle is present. Hereinafter, the calculation process of the second vehicle identification information performed by the second vehicle identification information calculation unit 107 will be explained with reference to FIG. 10A through FIG. 10D.

Figure 10A:
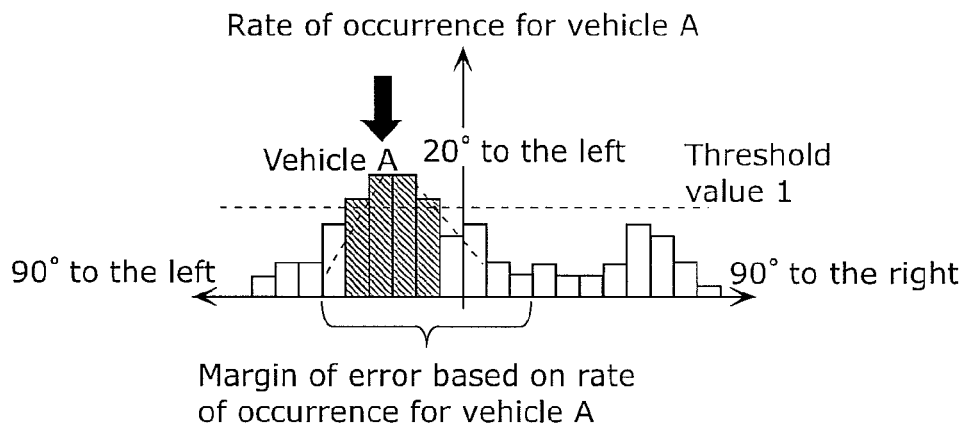
FIG. 10A shows an example of rate of occurrence distribution of identified sound source directions, where the horizontal axis represents identified sound source direction and the vertical axis represents rate of occurrence.

FIG. 10A shows a rate of occurrence distribution of identified sound source directions, where the horizontal axis represents identified sound source direction and the vertical axis represents rate of occurrence.

First, the first vehicle identification unit 106 identifies that the first vehicle is present at 20 degrees to the left using the first threshold value (a threshold value included in the vehicle identification information).

Next, the occupancy degree calculation unit 201 calculates the degree of occupancy of the identified the first vehicle. Here, the degree of occupancy refers to a ratio of a total value of the rate of occurrence of all of the sound source directions to a total value of the rate of occurrence of the one or more sound source directions corresponding to the direction identified as the direction in which the first vehicle is present.

For example, assume that the entire frequency band used to identify the direction in which the vehicle is present is from 50 Hz to 350 Hz, the analysis sections are set in 5 Hz increments, and for the purpose of explanation, the time interval is set to one. As a result, the number of analysis sections is 60 (60=(350−50)/5).

The vehicle A is identified at 20 degrees to the left. The occupancy degree calculation unit 201 therefore calculates the rate of occurrence of a range of directions having a breadth of 30 degrees centered around 20 degrees to the left (15 degrees to the right and left of the direction 20 degrees to the left). That is, the occupancy degree calculation unit 201 calculates the total value of the rate of occurrence (vertical axis) for the range of sound source directions from 5 degrees to the right to 35 degrees to the left, which corresponds to the direction (20 degrees to the left) identified as the sound source direction in which the vehicle A (the first vehicle) is present. The identification of the sound source direction based on vehicle sound often includes a margin of error, as an absolutely accurate calculation of the direction in which a vehicle is present is not always possible. As a result of actual tests, a margin of error of approximately 15 degrees was prevalent when using the current technique. Consequently, in light of this margin of error, the total value of the rate of occurrence across a range of 15 degrees to the left and right in the first embodiment is calculated as the total value of the rate of occurrence of the sound source directions corresponding to the direction identified as the direction in which the first vehicle is present.

Figure 10B:
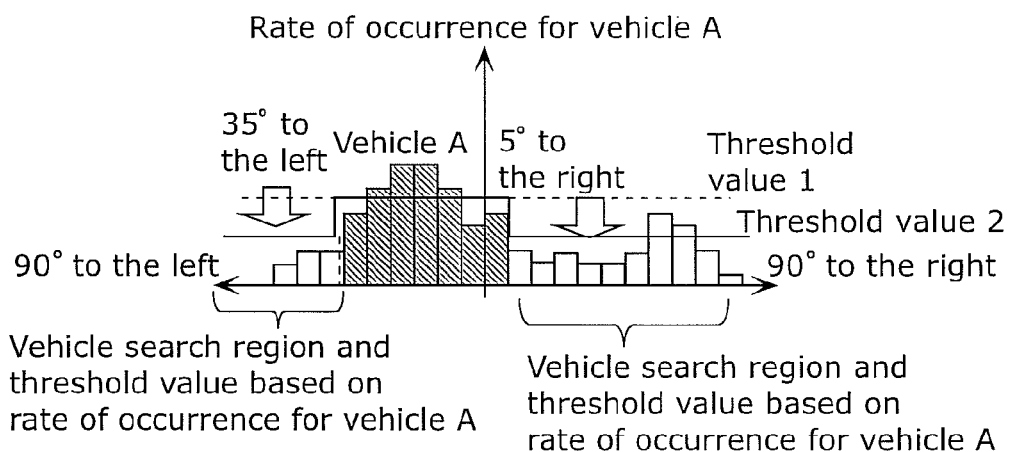
FIG. 10B shows an explanation of the second threshold value derived from the rate of occurrence distribution shown in FIG. 10A.

FIG. 10B shows an explanation of the second threshold value derived from the rate of occurrence distribution shown in FIG. 10A. In FIG. 10B, the distribution highlighted with diagonal black lines shows the range (hereinafter also referred to as "the analysis sections occupied by the first vehicle") identified as "the sound source direction corresponding to the direction identified as the direction in which the first vehicle (the vehicle A) is present". For example, if a total of 15 sections are identified as having a sound source direction that corresponds to the direction in which the first vehicle (the vehicle A) is present (that is, the number of analysis sections corresponding to the identified sound source directions is 15), then the occupancy degree calculation unit 201 calculates the degree of occupancy to be 25% (25=15/60×100).

Next, the second threshold value calculation unit 202 calculates the second vehicle identification information based on the degree of occupancy. In the first embodiment, the threshold value of the rate of occurrence (the second threshold value) is calculated as the second vehicle identification information. For example, the second threshold value is a value obtained by multiplying the number of analysis sections not occupied by the first vehicle by a predetermined rate (for example 25%). In the case of the first embodiment, since the number of analysis sections occupied by the first vehicle is 15, the number of analysis sections not occupied is 45 (45=60−15). Therefore, by multiplying the predetermined rate (for example, 25%) by the number of analysis sections not occupied, a second threshold value of 11.25 is obtained (11.25=45×25%).

Moreover, the search direction calculation unit 203 calculates the sound source directions not included in the analysis sections occupied by the first vehicle (referred to as a second vehicle search region). In the first embodiment, the first vehicle is identified as being present at 20 degrees to the left. Here, the second vehicle search region is set to be the directions other than those included in the predetermined range (that is, other than the analysis sections occupied by the first vehicle). Here, the predetermined range is, for example, a range of 15 degrees to the right and left. In FIG. 10B, the range from 90 degrees to the left to 35 degrees to the left and the range from 5 degrees to the right to 90 degrees to the right are calculated as the second vehicle search region.

With the above processes, the second vehicle identification information calculation unit 107 calculates the second vehicle identification information, which includes the second threshold value and the second vehicle search region.

It is to be noted that the second vehicle identification information calculation unit 107 may calculate the second threshold value to be different for each sound source direction instead of including the second threshold value and the second vehicle search region separately in the second vehicle identification information. Specifically, the second threshold value for the sound source directions included in the analysis sections occupied by the first vehicle is set to be the same value as the first threshold value, while the second threshold value for all other sound source directions (that is, the sound source directions included in the second vehicle search region) is set to be the threshold value calculated by the second threshold value calculation unit 202. As a result, the second vehicle identification unit 108 can identify, using the second threshold value, the direction in which the second vehicle is present from the range of directions not previously identified as the direction in which the first vehicle is present. The solid line shown in FIG. 10B (threshold value 2) represents the second threshold value calculated in this manner.

It is to be noted that the second vehicle identification information calculation unit 107 may, for each analysis region, calculate the second threshold value so that the second threshold value is smaller as (i) a ratio of a total value of the rates of occurrence of all of the sound source directions to a total value of the rates of occurrence for the one or more of the sound source directions corresponding to the direction identified as the direction in which the first vehicle is present increases, and as (ii) a frequency corresponding to the analysis region decreases, the analysis region being a collection of the plurality of analysis sections in each of the plurality of predetermined frequency bands.

As a result, the second vehicle identification information calculation unit 107 can calculate a more suitable threshold value by taking into consideration the general disposition in which the rate of occurrence increases with frequency.

Figure 10C:
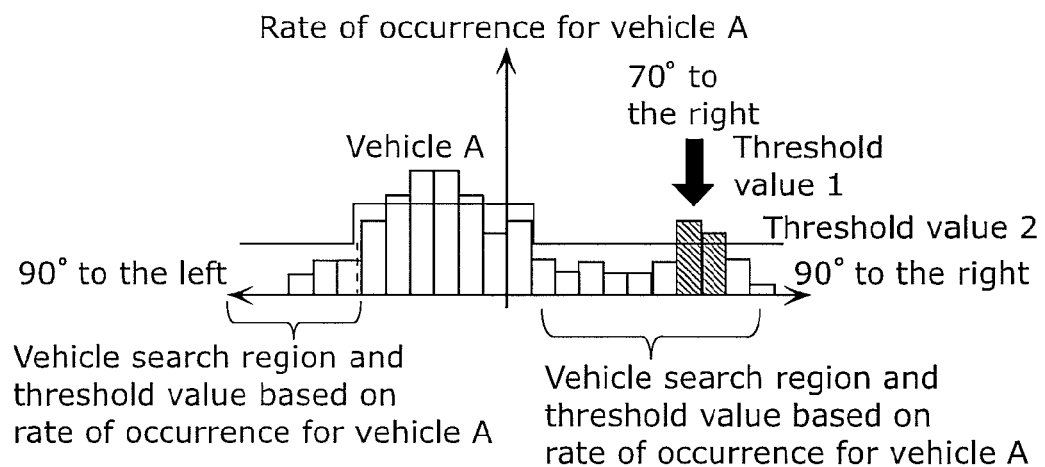
FIG. 10C shows the second threshold value added to the rate of occurrence distribution shown in FIG. 10A.

The second vehicle identification unit 108 identifies the second vehicle using the calculated the second vehicle identification information. Specifically, the second vehicle identification unit 108 identifies, as the direction in which the second vehicle is present, one or more of the sound source directions for which a corresponding one or more of the rates of occurrence calculated is greater than or equal to the second threshold value included in the second vehicle identification information. For example, assume that the second vehicle identification information calculation unit 107 calculates the second vehicle identification information including the second vehicle search region (from 90 degrees to the left to 35 degrees to the left, and from 5 degrees to the right to 90 degrees to the right), and the second threshold value of the rate of occurrence (11.25), as is shown in FIG. 10B FIG. 10C shows the rate of occurrence distribution shown in FIG. 10A with the second threshold value added thereon. As shown in FIG. 10C, the rate of occurrence of the sound source directions centered around 70 degrees to the right (the portion highlighted with black diagonal lines) exceeds the second threshold value. The second vehicle identification unit 108 identifies that direction as the direction in which the second vehicle is present. Here, the second vehicle is the vehicle B present behind the vehicle A shown in FIG. 7. Consequently, it is possible to identify the direction of the vehicle B obscured by the vehicle sound from the vehicle A with the vehicle direction identification device 110 according to the first embodiment.

It is to be noted that while it was explained in the first embodiment that second vehicle identification information is calculated, the same effect can be achieved by using vehicle identification information (the first vehicle identification information, for example) for identifying vehicles and changing the values, for instance, for use for the second vehicle.

Moreover, the occupancy degree calculation unit 201 may calculate the degree of occupancy using a predetermined duration which includes a plurality of time intervals. For example, in the above-noted specific example, the time interval which establishes the analysis sections is set to 100 ms, and the time used to calculate the rate of occurrence is 500 ms (500=100 ms×5). Here, the number of analysis sections is 300 (300=(500/100)×(350−50)/5).

Moreover, if a total of 15 sections are identified as one of the sound source directions corresponding to the direction in which the first vehicle (the vehicle A) is present (that is, the number of analysis sections which correspond to the identified the sound source direction is 15), then the occupancy degree calculation unit 201 calculates the degree of occupancy to be 5% (5=15/300×100).

In this case, since the number of analysis sections occupied by the first vehicle is 15, the number of analysis sections not occupied is 285 (285=300−15). Therefore, by multiplying the predetermined rate (for example, 25%) by the number of analysis sections not occupied, a threshold value of the rate of occurrence of 71.25 is obtained (71.25=285×25%).

In the technical field of vehicle detection using sound, sound does not necessarily always appear throughout a fixed interval, but can cuts in and out. When sound cuts in and out, it is possible to increase the accuracy of detection by increasing the length of the analysis section.

The vehicle display unit 109 displays identified vehicles, and can be thought of, for example, as a liquid crystal display or a warning lamp.

Figure 10D:
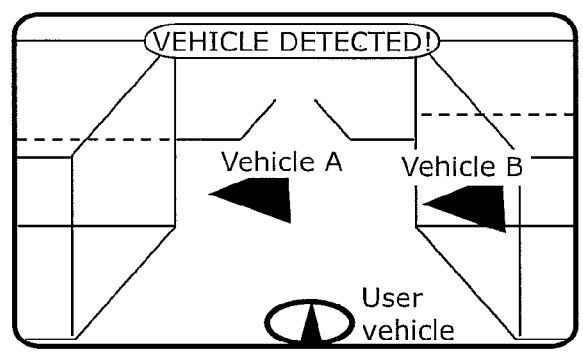
FIG. 10D is an example of a display shown by a vehicle display unit in which an identified vehicle A and vehicle B are shown.

FIG. 10D is an example of a display shown by the vehicle display unit 109 in which the identified the vehicle A and the vehicle B are shown. With the vehicle direction identification device 110, it is possible to identify the direction of the vehicle B in addition to the leading the vehicle A.

It is to be noted that the vehicle display unit 109 may notify the user of the direction of the vehicle aurally (for example, by warning sound or verbal notification), and furthermore may notify the user visually as previously described and aurally simultaneously.

Next, operational flow of the vehicle direction identification device 110 according to the first embodiment will be described with reference to FIG. 11, FIG. 12, FIG. 13, FIG. 14, and FIG. 15.

Figure 11:
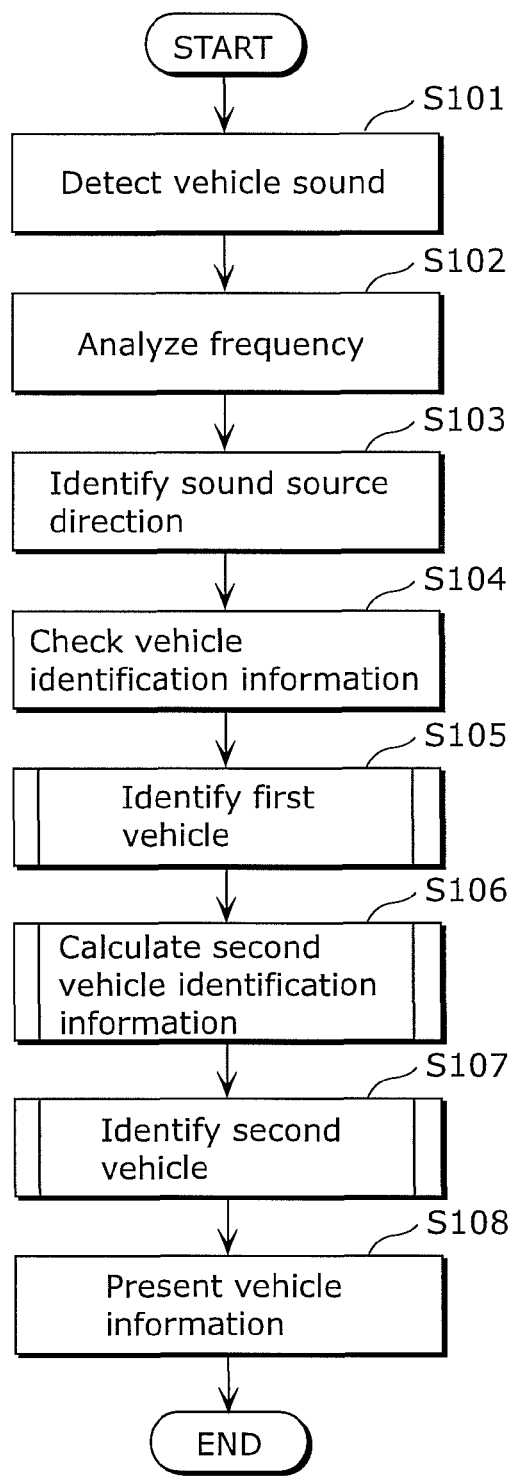
FIG. 11 is a flow chart illustrating the flow of processes performed by the vehicle direction identification device according to the first embodiment.

First, as shown in FIG. 11, vehicle sound is detected by the vehicle sound detection microphone 101 and 102 (step S101). Next, frequency analysis is performed by the frequency analysis unit 103 (step S102). Then the sound source direction for each of the analysis sections (that is, of each of the predetermined frequencies and time intervals) is identified by the sound source direction identification unit 104 based on the sound arrival time difference (step S103).

Next, the first vehicle identification unit 106 refers to the vehicle identification information stored in the vehicle identification information storage unit 105 (step S104). The first vehicle identification unit 106 then identifies the direction in which the first vehicle is present using the information indicating the sound source directions identified in step S103 (step S105).

Figure 12:
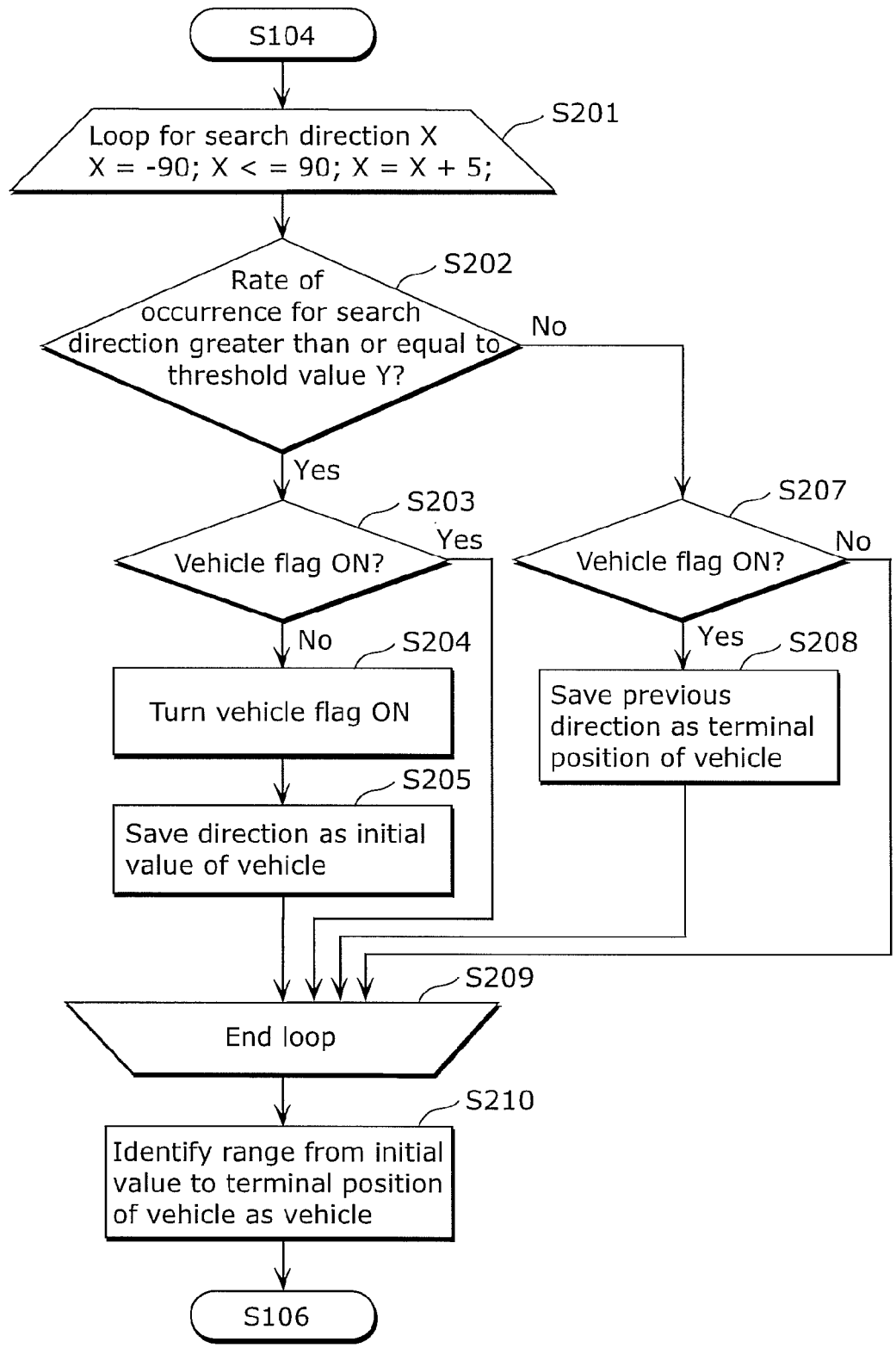
FIG. 12 is a flow chart illustrating the flow of processes performed by the first vehicle identification unit according to the first embodiment for identifying a first vehicle.

FIG. 12 illustrates step S105 in detail. The first vehicle identification unit 106 performs, for each search direction, the processes outlined in steps S202 through S209 by loop processing the search directions (step S201). Here, the search direction is a direction in which a sound source is searched for.

First, the first vehicle identification unit 106 determines whether or not the rate of occurrence for a given search direction is greater than or equal to the first threshold value "Y" (step S202). If the rate of occurrence is greater than or equal to the first threshold value Y (yes in step S202), in order to identify a vehicle range (that is, a range of possibility that a vehicle is present), the first vehicle identification unit 106 first determines whether or not a vehicle flag is ON (step S203). Here, if the vehicle flag is not ON (no in step S203), the first vehicle identification unit 106 turns the vehicle flag ON (step S204). The first vehicle identification unit 106 then saves the direction as an initial vehicle range value (step S205). The first vehicle identification unit 106 repeats this process for each of the search directions (step S209).

On the other hand, if the vehicle flag is already ON (yes in step S203), the first vehicle identification unit 106 continues the loop process from step S209.

However, if in step S202 the rate of occurrence is below the first threshold value Y (no in step S202), the first vehicle identification unit 106 determines whether or not the vehicle flag is ON (step S207). Here, if the vehicle flag is ON (yes in step S207), the first vehicle identification unit 106 saves the previous search direction as a terminal position for the vehicle range (step S208), then turns the vehicle flag OFF, and continues the loop process from step S209.

On the other hand, if the vehicle flag is already OFF (no in step S207), the first vehicle identification unit 106 continues the loop process from step S209. A range of directions in which a vehicle is present and for which rates of occurrence are greater than or equal to the first threshold value is identified with this process flow.

Next, the second vehicle identification information calculation unit 107 calculates the second vehicle identification information using the information indicating the identified the first vehicle (step S106 in FIG. 11).

Figure 13:
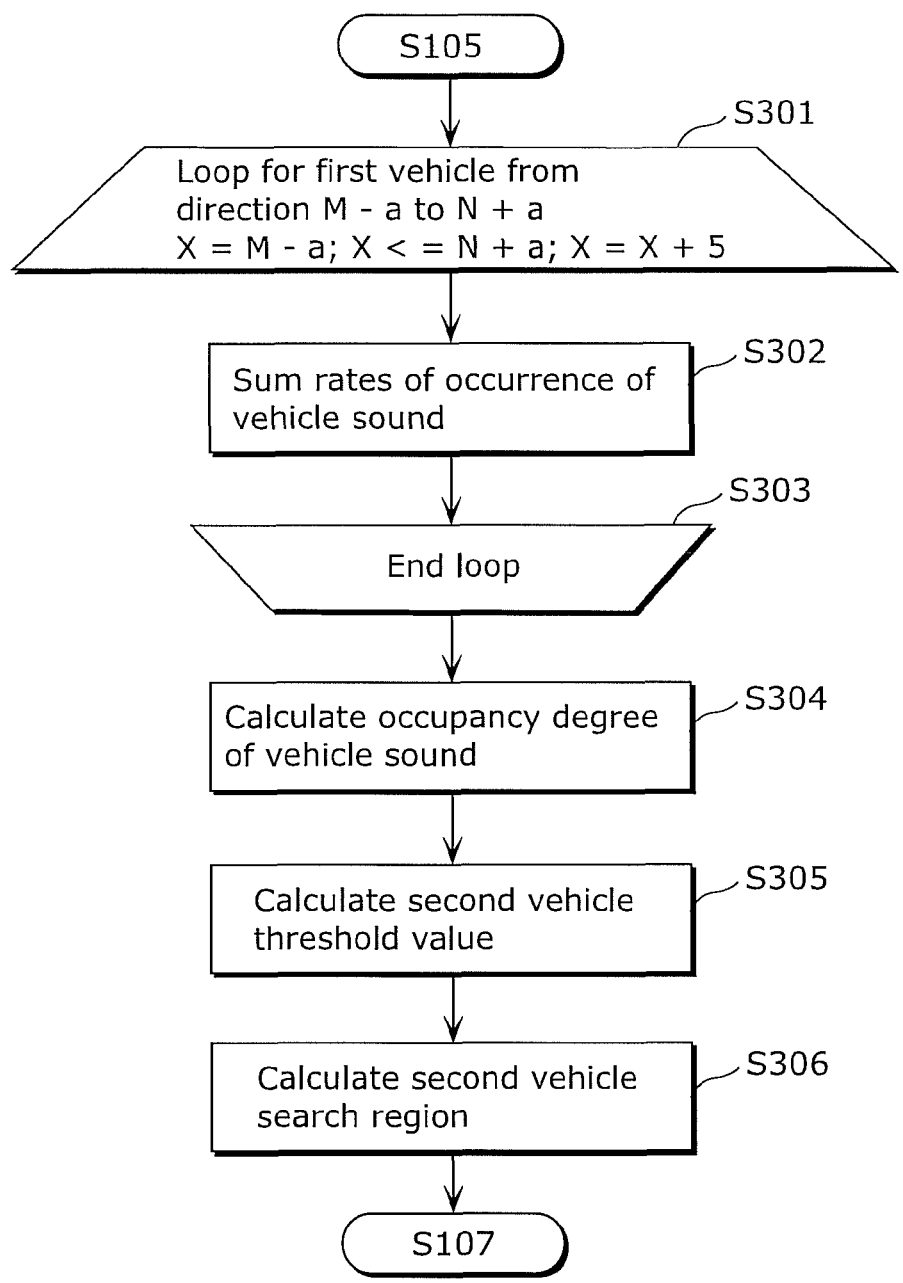
FIG. 13 is a flow chart illustrating the flow of processes performed by the second vehicle identification information calculation unit according to the first embodiment for calculating second vehicle identification information.

FIG. 13 illustrates step S106 in detail. First, the second vehicle identification information calculation unit 107 performs a loop process for a predetermined range "a" (a is 15 degrees to the left and right in the first embodiment) of the direction identified as the direction in which the first vehicle is present (step S301). The second vehicle identification information calculation unit 107 performs the loop processing on all of the sound source directions included in the range, outputs the sum of the rate of occurrences (step S302), then ends the loop process (step S303).

The occupancy degree calculation unit 201 then calculates the degree of occupancy of the identified the first vehicle (step S304).

Next, the second threshold value calculation unit 202 calculates the threshold value of the rate of occurrence (the second threshold value) for detecting the second vehicle (step S305). Moreover, the search direction calculation unit 203 calculates a direction in which to search for the second vehicle (the second vehicle search region) based on the direction in which the first vehicle is present (step S306). With the above processes, the second vehicle identification information calculation unit 107 calculates the second vehicle identification information, which includes the second threshold value and the second vehicle search region.

It is to be noted that in the first embodiment a range of 15 degrees to the left and right of the direction in which the first vehicle is present is used to define the sound source direction corresponding to the directions identified as the first vehicle, and the direction in which the second vehicle is present is identified from among all other directions (the second vehicle search region).

Next, the second vehicle identification unit 108 identifies the second vehicle using the calculated the second vehicle identification information (step S107 in FIG. 11).

Figure 14:
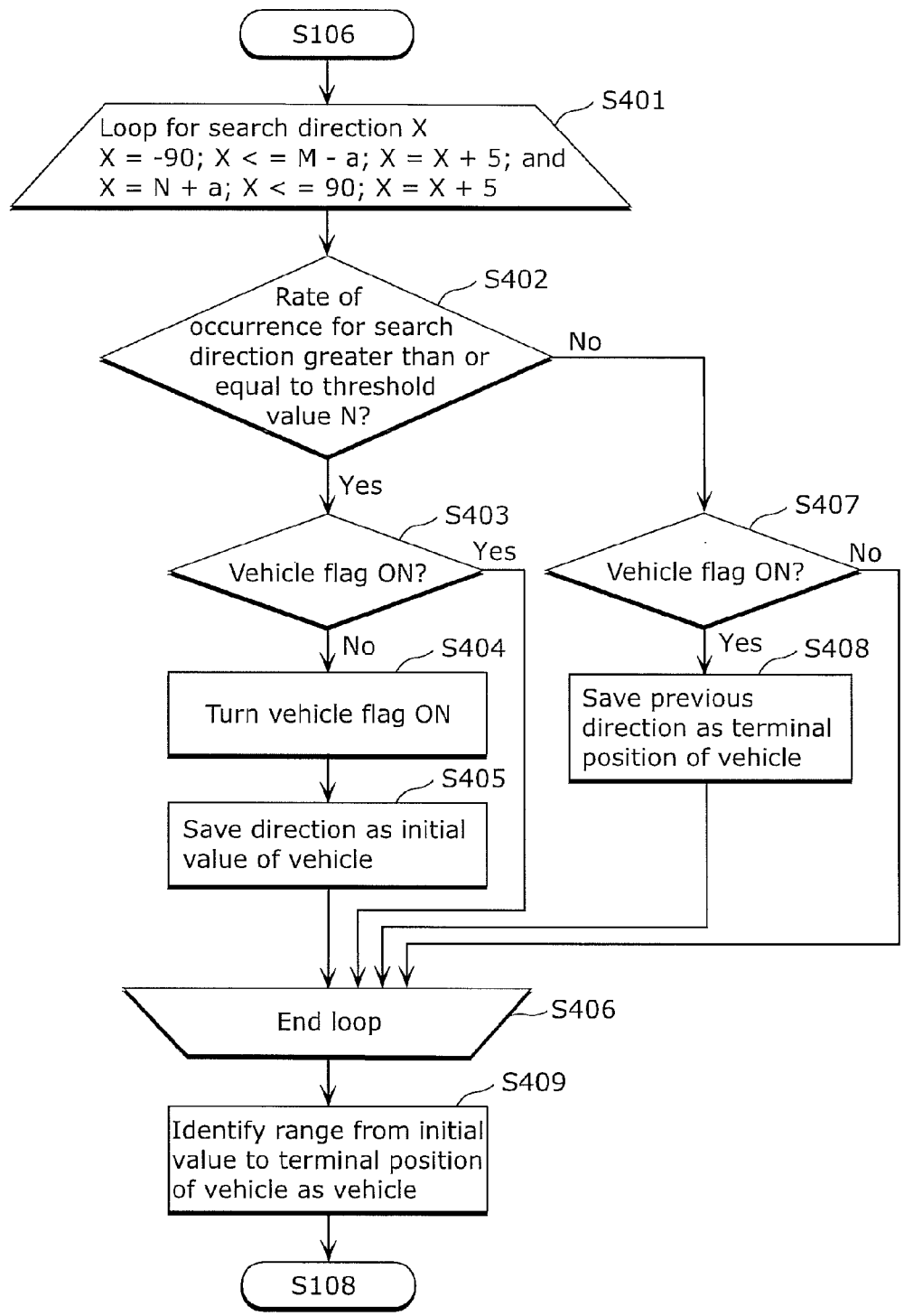
FIG. 14 is a flow chart illustrating the flow of processes performed by the second vehicle identification unit according to the first embodiment for identifying a second vehicle.
Figure 15:
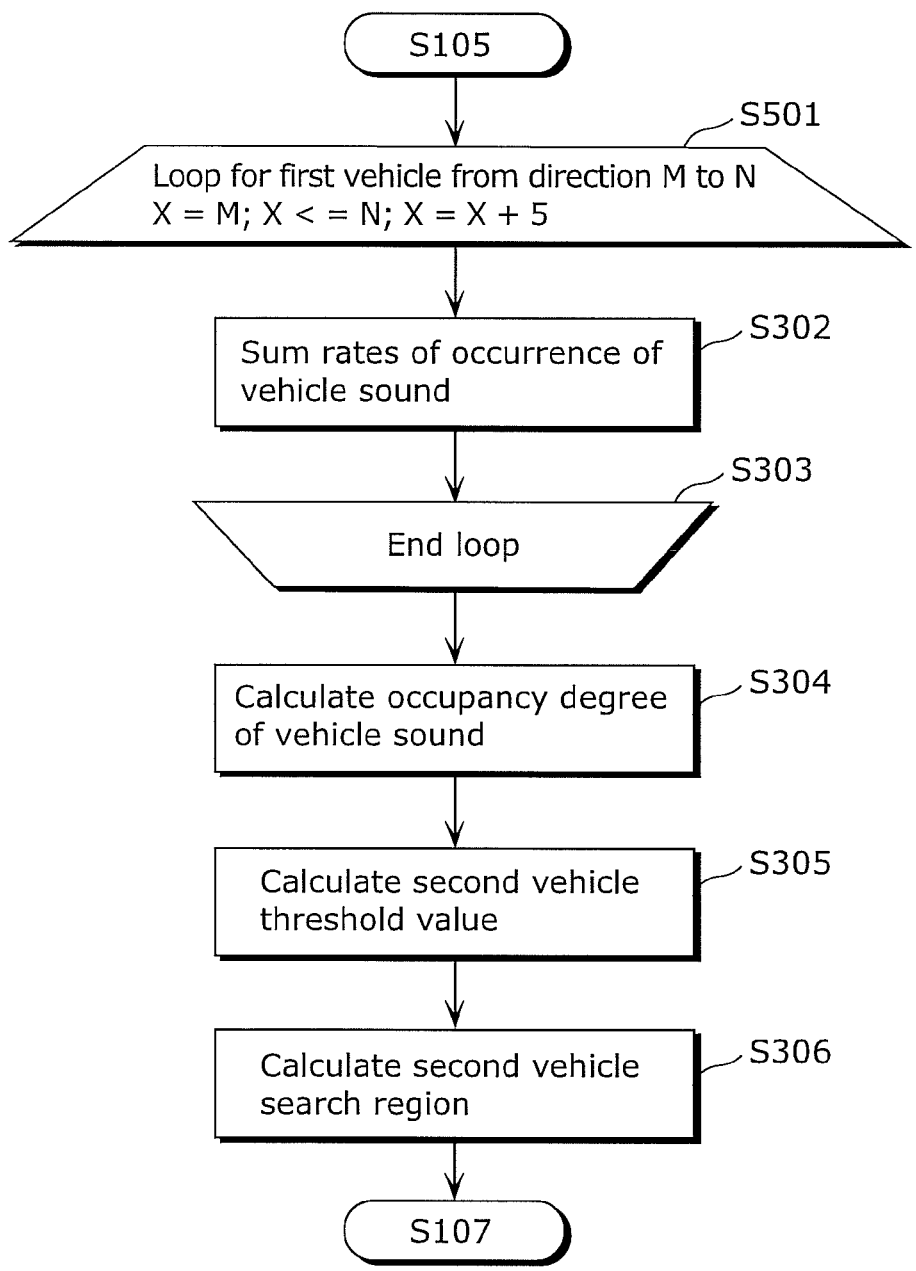
FIG. 15 is a flow chart illustrating the flow of processes performed by the second vehicle identification information calculation unit according to the first embodiment for calculating second vehicle identification information.

FIG. 14 illustrates step S107 in detail. The second vehicle identification unit 108 performs a loop process for each of the search directions "x", thereby processing each of the search directions (step S401). Here, the search is performed within the range of the sound source directions corresponding to the second vehicle search region included in the second vehicle identification information.

The second vehicle identification unit 108 determines whether or not the rate of occurrence "Y" for the search direction is greater than or equal to the second threshold value "N" (step S402).

If the rate of occurrence is greater than or equal to the second threshold value (yes in step S402), the second vehicle identification unit 108 first determines whether or not the vehicle flag is ON in order to identify the vehicle range (step S403). Here, if the vehicle flag is not ON (no in step S403), the second vehicle identification unit 108 turns the vehicle flag ON (step S404). The second vehicle identification unit 108 then saves the direction as an initial vehicle range value (step S405). The second vehicle identification unit 108 repeats this process for each of the search directions (step S406).

On the other hand, if the vehicle flag is already ON (yes in step S403), the second vehicle identification unit 108 continues the loop process for each search direction from step S401 (step S406).

However, if the rate of occurrence is below the second threshold value N (no in step S402), the second vehicle identification unit 108 determines whether or not the vehicle flag is ON (step S407).

Here, if the vehicle flag is ON (yes in step S407), the second vehicle identification unit 108 saves the previous search direction as a terminal position for the vehicle range (step S408). The loop process starting from step S401 is then continued (step S406).

If the vehicle flag is not ON (no in step S407), the second vehicle identification unit 108 continues the loop process from step S401 (step S406).

After the loop process has been performed for all of the search directions X included in the search region, the second vehicle identification unit 108 identifies, as the direction in which the second vehicle is present, the vehicle range from the initial vehicle range value to the terminal position (step S409).

Finally, the vehicle display unit 109 displays the vehicle in the identified direction (step S108 in FIG. 11).

It is to be noted that although in the first embodiment the predetermined frequency and the predetermined time are made into one segment and the a vehicle is identified based on the rate of occurrence for each of the sound source directions, the first embodiment is not limited thereto.

For example, at least one of the first vehicle identification unit 106 and the second vehicle identification information calculation unit 107 may refer to an analysis section adjacent to the previously noted analysis section horizontally along the time axis or vertically along the frequency axis. Here, when the corresponding sound source directions of the adjacent analysis sections are the same or similar to within, for example, ±5 degrees (for example, when the difference in sound source direction of the adjacent analysis sections is lower than a predetermined threshold value), the previously noted analysis section is weighted. Furthermore, a greater weight is assigned the analysis sections have a higher degree of similarity (for example, the smaller the difference in sound source direction of the adjacent analysis sections, the greater an amount of weight is attributed). The rate of occurrence of each sound source direction may then be calculated as a count of the weighted analysis sections. Specifically, when the analysis sections A, B, and C identified as having a sound source direction of +30 degrees have a weighted value of 1.2, 1.0, and 1.1, respectively, the rate of occurrence corresponding to the sound source direction of +30 degrees is calculated to be 3.3 (3.3=1×1.2+1×1.0+1×1.1).

Moreover, in the first embodiment, as shown in step S301 in FIG. 13, when the second vehicle identification information calculation unit calculates the second vehicle identification information, the direction identified as the direction in which the first vehicle is present is given a predetermined range of "a". However, as is shown in step S501 in FIG. 15, for example, the second vehicle identification information calculation unit does not necessarily need to assign a range.

Although vehicle sound includes a margin of error, there is a tendency for a majority of the sound source directions to be distributed in a direction in which a vehicle is actually present. However, the occurrence of noise such as wind noise is instantaneous and random, and the sound source directions of noises generally vary from segment to segment. Consequently, as a result of at least one of the first vehicle identification unit 106 and the second vehicle identification information calculation unit 107 attributing weight in this manner instead of simply summing the segments upon calculating the rates of occurrence, vehicle sound can be identified with increased accuracy.

Moreover, the vehicle direction identification device 110 may manage the segments in terms of density based on the segments to be analyzed instead of the rate of occurrence of the segments and identify vehicles accordingly. The vehicle direction identification device 110 may also calculate the distribution profile based on rate of occurrence or density using, for example, gaussian distribution, and identify the direction in which a vehicle is present with the distribution profile values, that is, by comparing the average or variance value with the threshold value. In this case, when the distribution profile for a plurality of vehicles is multimodal, the rate of occurrence distribution is approximated by a parametric probability model such as a mixture gaussian distribution, and the direction in which the vehicle is present will be identified by comparing the parameter of the model with the threshold value.

At any rate, any method of identifying a single cluster that represents a direction from which sound from a vehicle originates and has a predetermined distribution as the first vehicle using the vehicle identification information falls within the spirit of the present disclosure.

It is to be noted that in the first embodiment the search direction X is described as a search range from −90 degrees to 90 degrees (the group of steps from step S201 to step S209 shown in FIG. 12, for example), but is not limited thereto. For example, the frontal direction is made to be 0 degrees when the microphones are fitted to the bumper as in the first embodiment, and the vehicle in the intersection is the closest. Moreover, it is normal for the rate of occurrence to increase when the vehicle is the closest. Accordingly, the first vehicle is often in the front even when the trailing second vehicle is obscured. Here, the first vehicle identification unit 106 may give priority to the search for the first vehicle to the front. For example the first vehicle identification unit 106 may search from the front (0 degrees) to the right (90 degrees), then search from the front to the left (−90 degrees). Other practical applications are possible as well, such as processing these searches in parallel. As a result, it is possible for the first vehicle identification unit 106 to identify the first vehicle quicker and then continue with the identification of the second vehicle.

Embodiment 2

Figure 16:
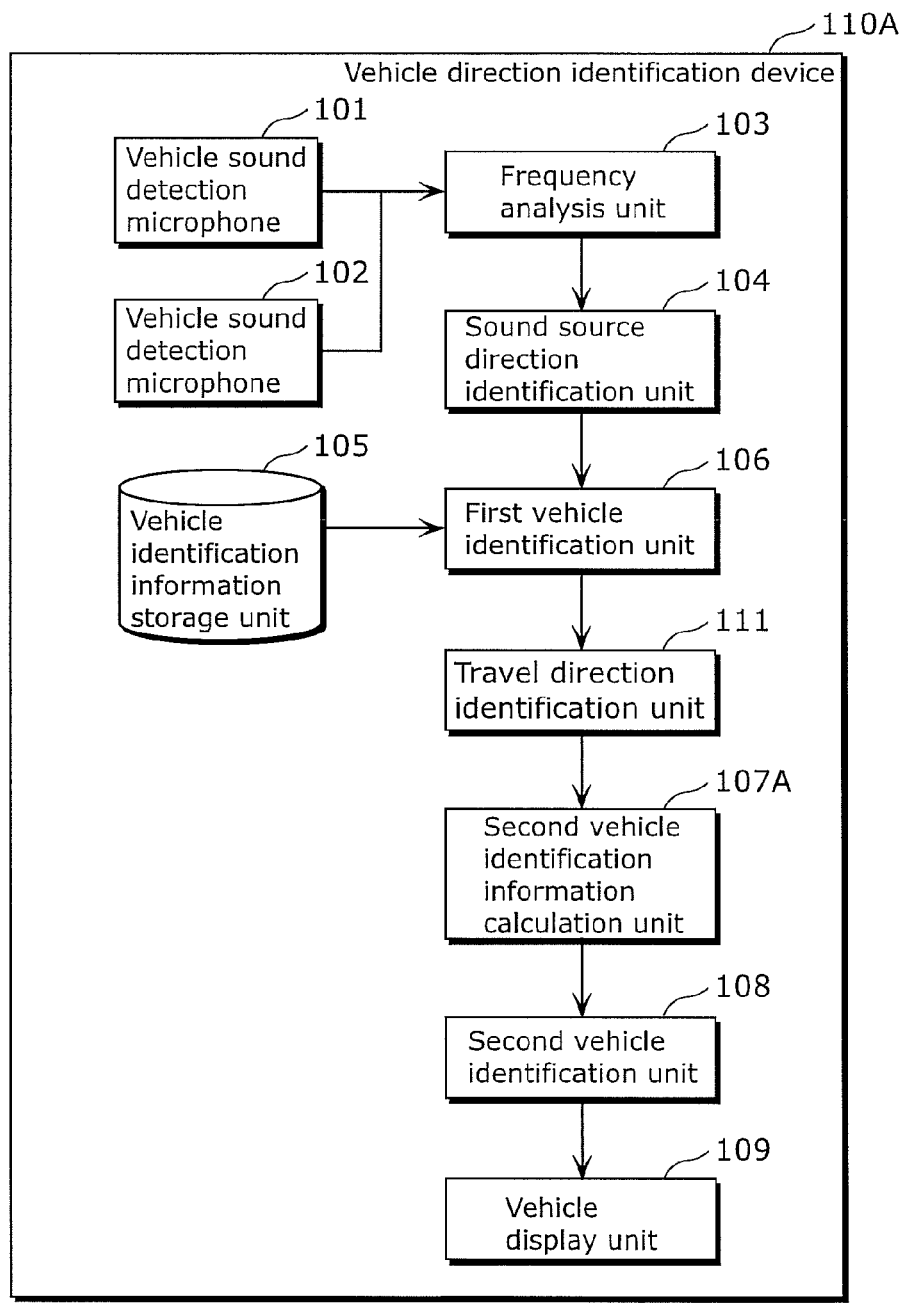
FIG. 16 is a block diagram showing a configuration of a vehicle direction identification device according to the second embodiment.

FIG. 16 is a block diagram showing a configuration of a vehicle direction identification device 110A according to the second embodiment. Here, a travel direction identification unit 111 is added to the configuration of the vehicle direction identification device 110 according to the first embodiment. The constituents which are the same as in the first embodiment use the same reference numerals and descriptions thereof will be omitted.

The travel direction identification unit 111 identifies a direction of travel of the first vehicle from any change over time in the direction in which the first vehicle is present as identified by the first vehicle identification unit 106. This will be explained in detail below.

FIG. 17A through FIG. 17E show an outline of the process of identifying the direction in which a vehicle is present performed by the vehicle direction identification device 110A.

Figure 17A:
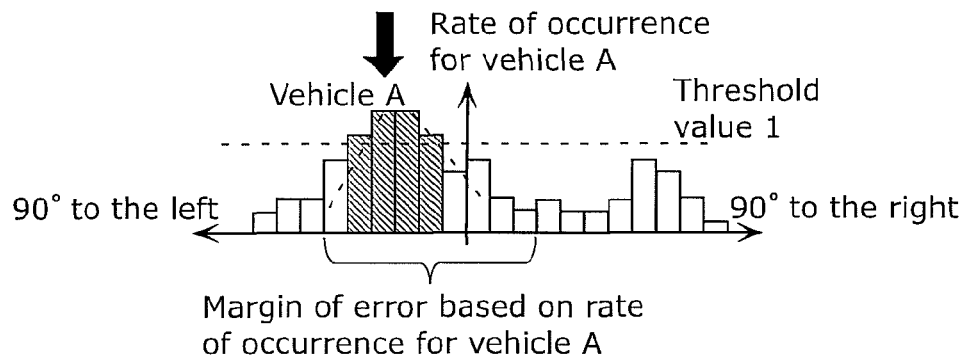
FIG. 17A shows another example of rate of occurrence distribution of identified sound source directions, where the horizontal axis represents identified sound source direction and the vertical axis represents rate of occurrence.

Similarly to FIG. 10A, FIG. 17A shows the rate of occurrence distribution of detected sound source directions, where the horizontal axis represents sound source direction and the vertical axis represents rate of occurrence.

First, the first vehicle identification unit 106 identifies that the first vehicle is present at 20 degrees to the left (the vehicle A in FIG. 17A) using the first threshold value (vehicle identification information).

Next, the first vehicle identification unit 106 identifies the direction in which the first vehicle is present once again from surrounding sound detected in the period by the vehicle sound detection microphone 101 and 102 after a predetermined period of time has elapsed.

Next, the travel direction identification unit 111 identifies, as a direction of travel of the first vehicle, the direction from the previously identified direction in which the first vehicle was present towards the currently identified direction in which the first vehicle is present.

Figure 17B:
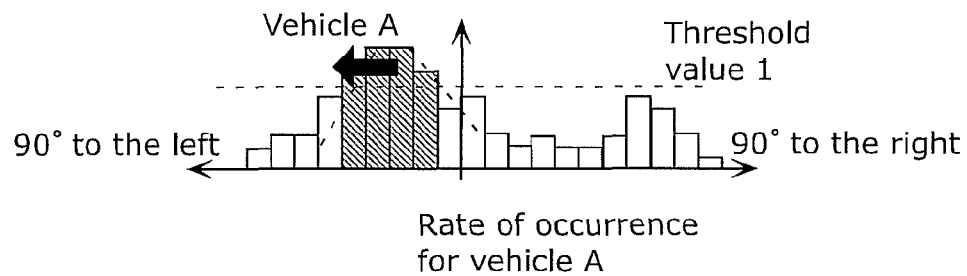
FIG. 17B shows the direction of travel of vehicle A.
Figure 17C:
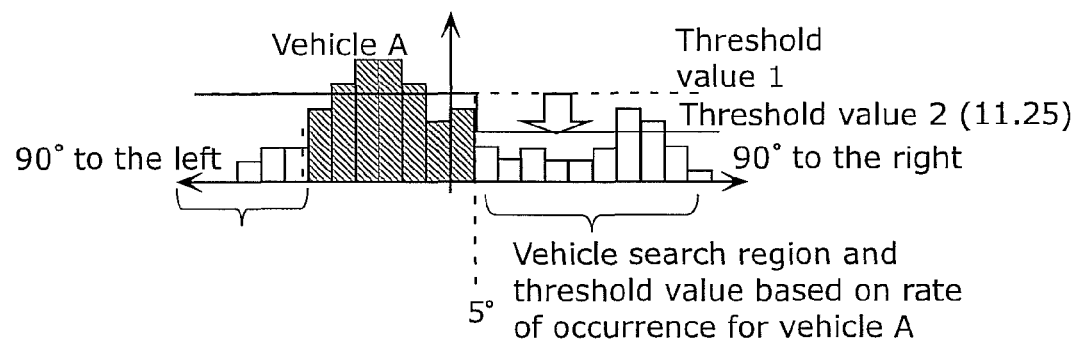
FIG. 17C shows the rate of occurrence distribution after a given period of time has passed since the time shown in FIG. 17B.

For example, as a result of the vehicle A traveling from a position having the rate of occurrence distribution shown in FIG. 17B to the left in the predetermined period, the vehicle A is identified as moving to a position having the rate of occurrence distribution shown in FIG. 17C. Here, from the rate of occurrence distribution shown in FIG. 17C, the first vehicle identification unit 106 identifies the direction in which the vehicle A is present to be 25 degrees to the left.

Here, the travel direction identification unit 111 identifies that the vehicle A is traveling in a direction from 20 degrees to the left to 25 degrees to the left respective to the front of the user vehicle, that is, that the vehicle A is traveling from right to left.

Similarly, the direction of travel of the first vehicle can be continually identified as a result of the first vehicle identification unit 106 identifying, for each of a plurality of predetermined time periods, the direction in which the first vehicle is present from the surrounding sound detected in a given time period, and the travel direction identification unit 111 identifying, as a direction of travel of the first vehicle, the direction from the previously identified direction in which the first vehicle was present towards the currently identified direction in which the first vehicle is present.

Next, the second vehicle identification information calculation unit 107A identifies the second vehicle search region using the identified direction of travel. This will be explained in detail below. The occupancy degree calculation unit included in the second vehicle identification information calculation unit 107A calculates the degree of occupancy of the identified the vehicle A. Similar to the first embodiment, when the vehicle A is identified at 20 degrees to the left, the rate of occurrence is calculated for a range of 15 degrees to the left and right of the direction 20 degrees to the left as the degree of occupancy of the vehicle A.

Specifically, the distribution represented by black diagonal lines in FIG. 17A show the analysis sections occupied by the first vehicle. For example, when a total of 15 analysis sections (when the rate of occurrence is 15) are identified to be occupied by the first vehicle, the degree of occupancy is calculated to be 25% by the occupancy degree calculation unit (25%=15/60×100).

Next, the second threshold value calculation unit calculates the second vehicle identification information based on the degree of occupancy. Similar to the first embodiment, since the number of analysis sections occupied by the first vehicle is 15, the number of analysis sections not occupied is 45 (45=60−15). Therefore, by multiplying the predetermined rate (for example, 25%) by the number of analysis sections not occupied, a threshold value of the rate of occurrence (the second threshold value) of 11.25 is obtained (11.25=45× 25%).

Next, the search direction calculation unit according to the second embodiment calculates, from among the sound source directions identified by the sound source direction identification unit 104, as a second vehicle search range, the plurality of sound source directions included in a direction that is opposite the direction of travel of the first vehicle, excluding the plurality of sound source directions that correspond to the direction identified as the direction in which the first vehicle is present. Afterwards, the second vehicle identification information calculation unit 107A calculates the second vehicle identification information, which includes the second vehicle search range. Furthermore, the second vehicle identification unit 108 identifies the direction in which the second vehicle is present from among the sound source directions included in the second vehicle search range.

For example, assume that the first vehicle identification unit 106 identifies that the first vehicle is present at 20 degrees to the left, and the travel direction identification unit 111 identifies that the first vehicle is traveling from right to left. Here, the search direction calculation unit sets the search region excluding a predetermined range (for example, a range of 15 degrees to the left and right) centered around the direction in which the first vehicle is currently present, as well as from 5 degrees to the right to 90 degrees to the right, which covers the directions opposite the direction of travel of the vehicle A. As a result, the second vehicle identification information calculation unit 107A calculates the second vehicle search range, which is from 5 degrees to the right to 90 degrees to the right, and the second vehicle identification information, which includes the second threshold value.

It is to be noted that similar to the second vehicle identification information calculation unit 107 according to the first embodiment, the second vehicle identification information calculation unit 107A according to the second embodiment may calculate the second threshold value to be different for each sound source direction instead of including the second threshold value and the second vehicle search region separately in the second vehicle identification information. The solid line shown in FIG. 17C (threshold value 2) represents the second threshold value calculated in this manner. As shown in FIG. 17C, the second threshold value is set to 11.25 in the range from 5 degrees to the right to 90 degrees to the right.

Figure 17D:
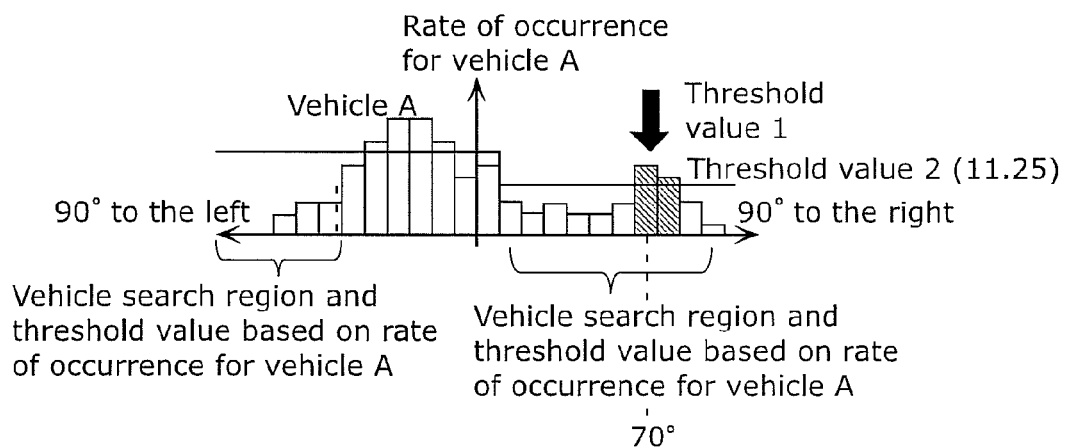
FIG. 17D shows the rate of occurrences which exceed the second threshold value in the rate of occurrence distribution.

Next, the second vehicle identification unit 108 identifies the second vehicle using the calculated the second vehicle identification information. As shown in FIG. 17D, the sound source direction of 70 degrees to the right has a rate of occurrence (the portions highlighted with black diagonal lines) which exceeds the second threshold value. The second vehicle identification unit 108 identifies that direction of the source of the sound as the direction in which the second vehicle is present. This vehicle equates to the vehicle B seen behind the vehicle A in FIG. 7 and FIG. 17E. That is, the vehicle B which is obscured by the vehicle sound from the vehicle A can be detected as a result of the second vehicle identification information calculation unit 107A included in the vehicle direction identification device 110A according to the second embodiment calculating the vehicle identification information.

Figure 17E:
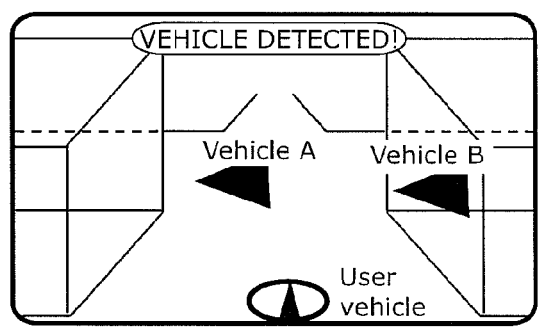
FIG. 17E shows the positional relationship of vehicle A and vehicle B.

FIG. 17E is an example of a display of the vehicle for which a direction has been identified by the vehicle direction identification device 110A displayed on the vehicle display unit 109. FIG. 17E shows that the vehicle B has been detected trailing behind the vehicle A.

The possibility of detection of noise and such by error with the second threshold value increases due to the value being lower than the first threshold value. On the other hand, by determining the direction of travel of a detected vehicle and making the opposite direction the search region (in other words, behind the detected vehicle), it is possible to suppress detection error due to noise and provide only the necessary information.

Particularly vehicles behind the first vehicle and vehicles in blind spots pose a risk of collision. On the other hand, notification of vehicles which have already passed by or vehicles which the user has already noticed is unnecessary. It is possible to efficiently detect a vehicle following behind an already detected vehicle with the use of the vehicle direction identification device 110A according to the second embodiment.

Next, operational flow of the vehicle direction identification device 110A according to the second embodiment will be described with reference to FIG. 18, FIG. 19, FIG. 20, FIG. 21, and FIG. 22. The steps which are the same as in the first embodiment use the same reference numerals.

Figure 18:
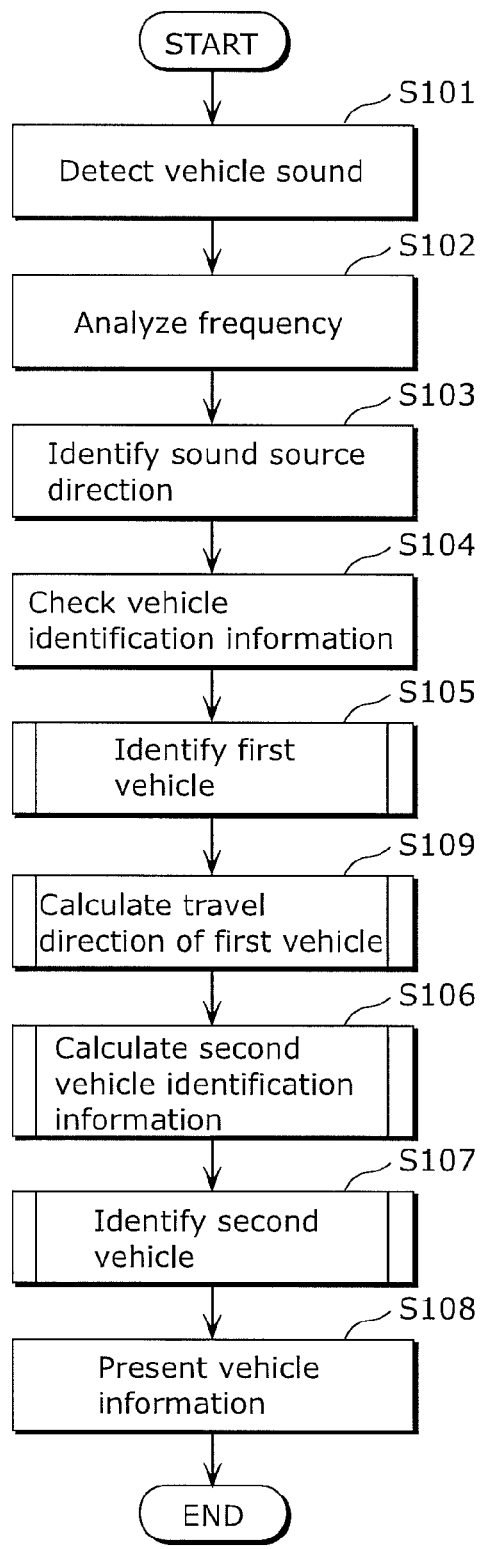
FIG. 18 is a flow chart illustrating the flow of processes performed by the vehicle direction identification device according to the second embodiment.

First, as shown in FIG.18, vehicle sound is detected by the vehicle sound detection microphone 101 and 102 (step S101).

Next, frequency analysis is performed by the frequency analysis unit 103 (step S102).

Then the sound source direction for each of the predetermined frequencies and time intervals is identified by the sound source direction identification unit 104 based on the sound arrival time difference (step S103).

Next, the vehicle identification information stored in the vehicle identification information storage unit 105 is referred to (step S104). The first vehicle identification unit 106 then identifies the first vehicle using the information indicating the sound source directions identified in step S103 (step S105).

Figure 19:
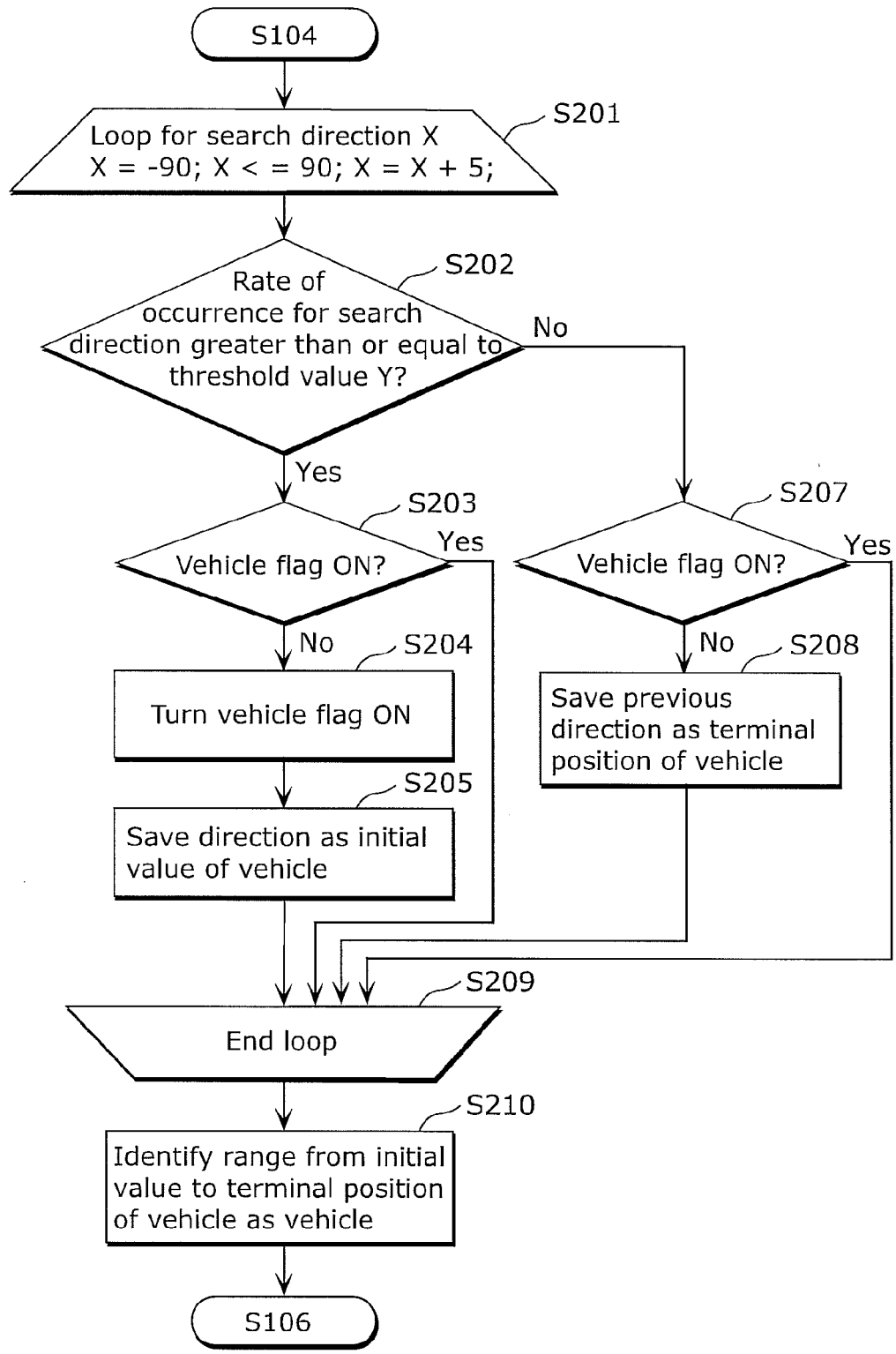
FIG. 19 is a flow chart illustrating the flow of processes performed by the first vehicle identification unit according to the second embodiment for identifying a first vehicle.

FIG. 19 shows the details of the step S105 performed by the first vehicle identification unit 106. The first vehicle identification unit 106 first performs a loop process for the search directions, thereby processing each of the search directions (step S201). The first vehicle identification unit 106 determines whether or not the rate of occurrence for a given search direction is greater than or equal to the first threshold value "Y" in the loop (step S202). If the rate of occurrence is greater than or equal to the first threshold value Y (yes in step S202), the first vehicle identification unit 106 first determines whether or not a vehicle flag is ON in order to search a vehicle range (step S203). Here, if the vehicle flag is not ON (no in step S203), the first vehicle identification unit 106 turns the vehicle flag ON (step S204). The direction is then saved as an initial vehicle range value (step S205). The first vehicle identification unit 106 repeats (loops) this process for each of the search directions (step S209).

On the other hand, if the vehicle flag is already ON (yes in step S203), the first vehicle identification unit 106 continues the loop process by returning to step S201 from step S209.

However, if in step S202 the rate of occurrence is below the first threshold value Y (no in step S202), the first vehicle identification unit 106 determines whether or not the vehicle flag is ON (step S207). If the vehicle flag is ON (yes in step S207), the first vehicle identification unit 106 saves the previous search direction as a terminal position of the vehicle (step S208) and continues the loop process by returning to step S201 from step S209.

On the other hand, if the vehicle flag is already OFF, the first vehicle identification unit 106 continues the loop process by returning to step S201 from step S209.

A range of directions in which a vehicle is present and for which rates of occurrence are greater than or equal to the first threshold value is identified with this process flow. Furthermore, in order to identify the direction of travel, the travel direction identification unit according to the second embodiment identifies, for example, the center between the initial vehicle range value and the terminal position as the position of the vehicle (step S209).

Next, the travel direction identification unit 111 identifies the direction of travel of the vehicle (step S109).

Figure 20:
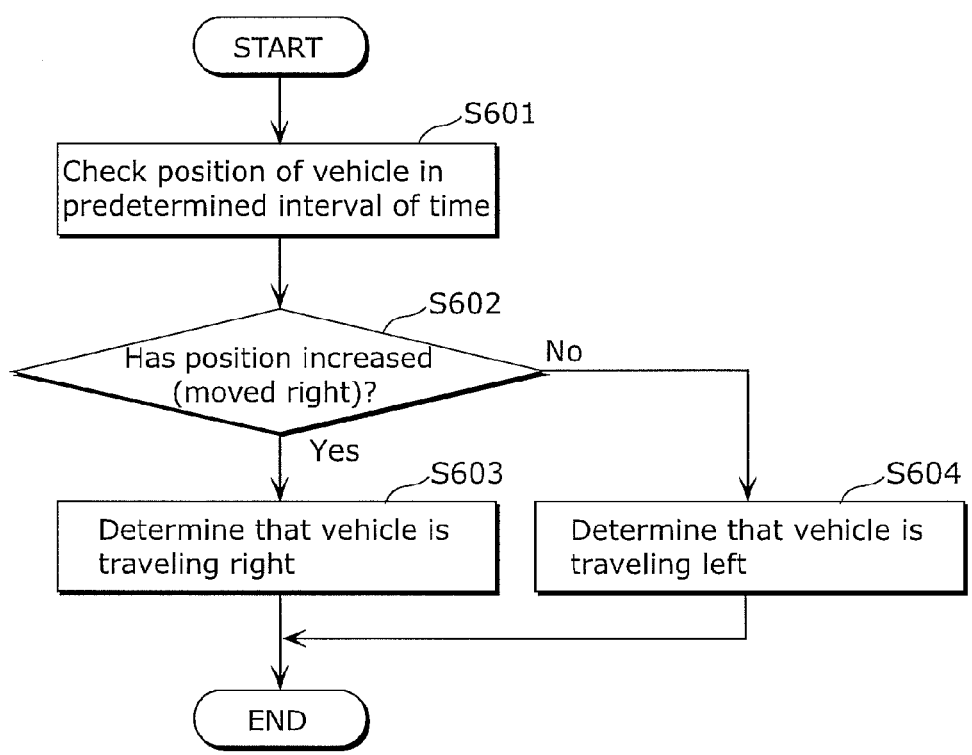
FIG. 20 is a flow chart illustrating the flow of processes performed by the travel direction identification unit according to the second embodiment for identifying vehicle direction of travel.

FIG. 20 illustrates step S109 in detail. The travel direction identification unit refers to a vehicle position shown as the direction (angle) in which the vehicle is present in each predetermined interval of time (step S601), and determines whether or not the value representing the position of the vehicle has increased (traveled to the right) by comparing the value representing the current vehicle position with the value representing the previous vehicle position (step S602). If the value representing the position has increased (yes in step S602), the travel direction identification unit 111 identifies that the vehicle is traveling from left to right (step S603). On the other hand, if the value representing the position has not increased (no in step S602), the travel direction identification unit 111 identifies that the vehicle is traveling from right to left (step S604).

Next, the second vehicle identification information calculation unit 107A calculates the second vehicle identification information using the information indicating the identified the first vehicle (step S106 in FIG. 18).

Figure 21:
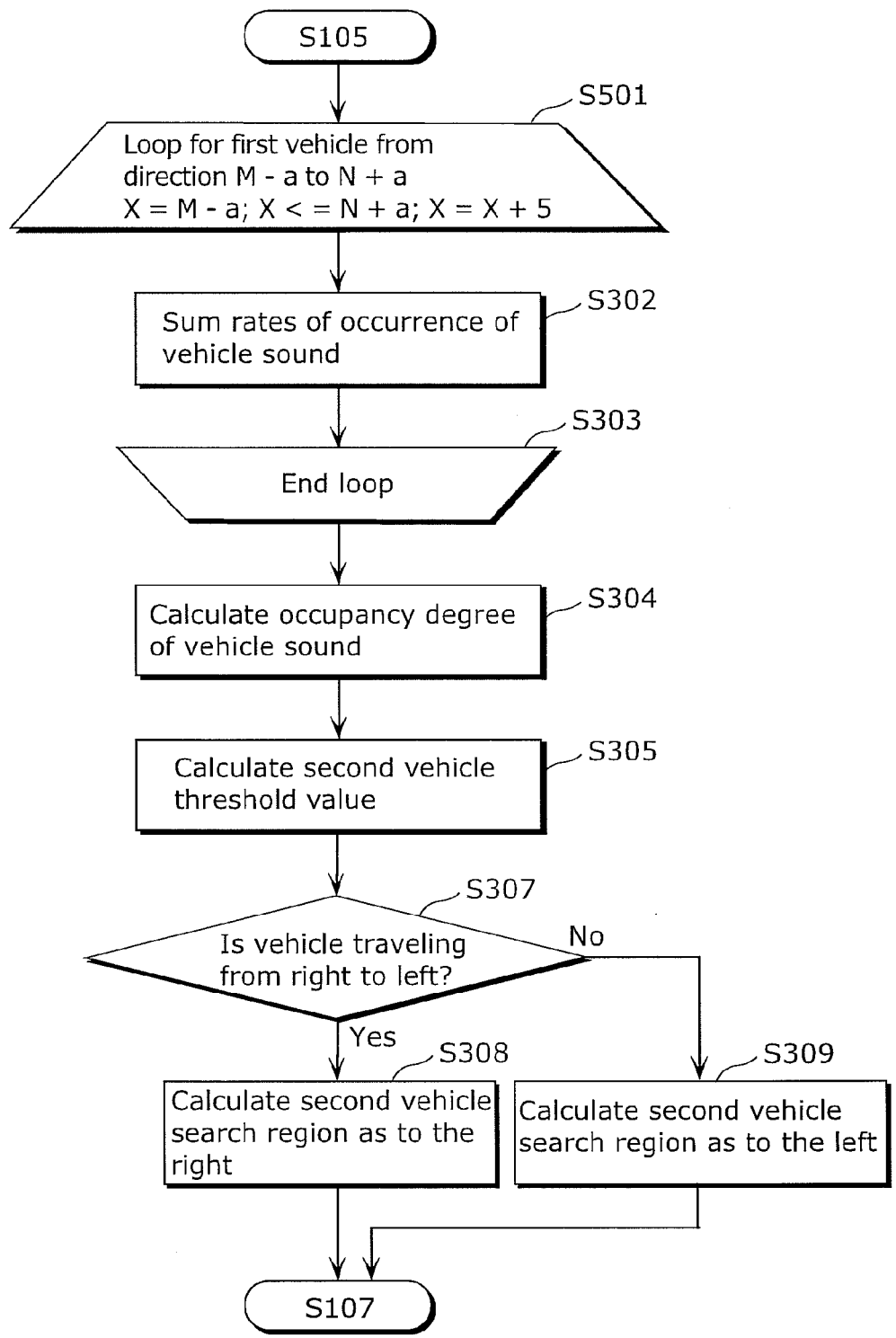
FIG. 21 is a flow chart illustrating the flow of processes performed by the second vehicle identification information calculation unit according to the second embodiment for calculating second vehicle identification information.

FIG. 21 illustrates step S106 shown in FIG. 18 in detail. The second vehicle identification information calculation unit 107A first sets a range having a predetermined breadth of "a" (15 degrees to the left and right in the second embodiment) for the identified direction in which the first vehicle is present as the sound source directions corresponding to the direction in which the first vehicle is present, and performs a loop process within this range (step S301). The second vehicle identification information calculation unit 107A repeats this process for each of the sound source directions included in the range (loop process), outputs the sum of the rate of occurrences (step S302), then ends the loop process (step S303).

The occupancy degree calculation unit then calculates the degree of occupancy of the identified the first vehicle (step S304).

Next, the second threshold value calculation unit calculates the threshold value of the rate of occurrence (the second threshold value) for identifying the second vehicle (step S305). Moreover, the search direction calculation unit checks whether or not the first vehicle is traveling from right to left based on the direction of travel of the first vehicle (step S307). Here, if the vehicle is traveling from right to left (yes in step S307), the search direction calculation unit calculates, as the second vehicle search region, the sound source directions to the right of the sound source direction corresponding to the direction in which the first vehicle is present (step S308).

On the other hand, if the vehicle is not traveling from right to left (no in step S307), the search direction calculation unit calculates the second vehicle search region to be the sound source directions to the left of the sound source direction corresponding to the direction in which the first vehicle is present (step S309). As a result, the second vehicle identification unit 108 searches behind the first vehicle.

Next, the second vehicle identification unit 108 identifies the second vehicle using the calculated the second vehicle identification information (step S107 in FIG. 18).

Figure 22:
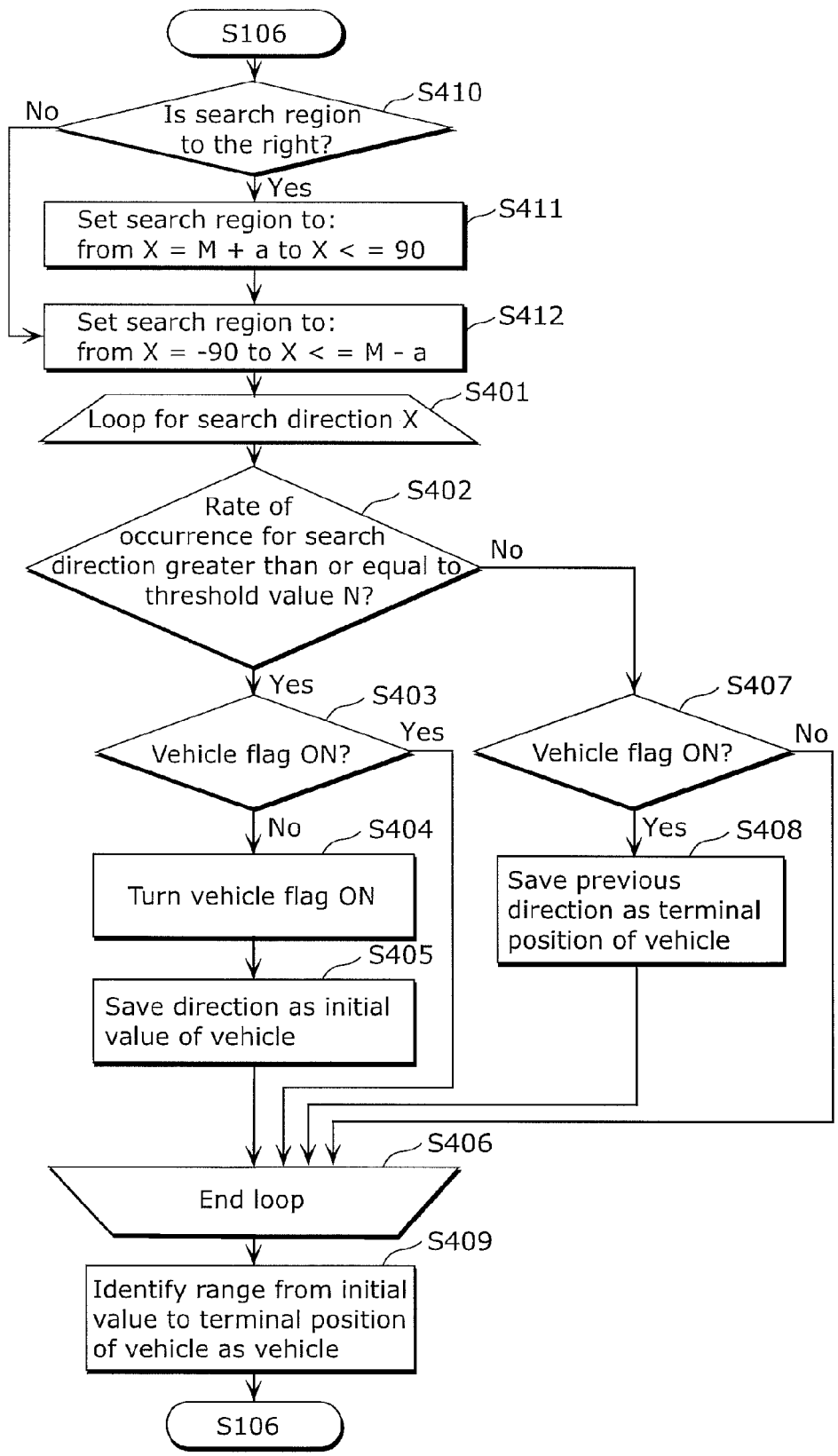
FIG. 22 is a flow chart illustrating the flow of processes performed by the second vehicle identification unit according to the second embodiment for identifying a second vehicle.

FIG. 22 illustrates step S107 shown in FIG. 18 in detail. The second vehicle identification unit 108 first processes each of the sound source directions (search directions) included in the search region with a loop process. Specifically, the second vehicle identification unit 108 checks whether or not the search region is to the right of the direction in which the first vehicle is present as identified by the first vehicle identification unit 106 (step S410). Here, if the search region is to the right (yes in step S410), the search region is set to be from the terminal position of the first vehicle (that is, the rightmost end of the sound source direction corresponding to the identified direction in which the first vehicle is present) to 90 degrees to the right (step S411).

On the other hand, if the search region is to the left of the direction in which the first vehicle is present as identified by the first vehicle identification unit 106 (no in step S410), the second vehicle identification unit 108 sets the search region to be from 90 degrees to the left to the initial vehicle range value of the first vehicle (that is, the leftmost end of the sound source direction corresponding to the identified direction in which the first vehicle is present) (step S412).

Next, the second vehicle identification unit 108 changes search direction based on the direction of position and direction of travel calculated as the second vehicle identification information, and repeats the process (loop process). That is, the second vehicle identification unit 108 determines, for each search direction "X", which are sound source directions included in the search region, whether or not the respective rate of occurrence is greater than or equal to the second threshold value "N" (step S402). If the rate of occurrence is greater than or equal to the second threshold value (yes in step S402), the second vehicle identification unit 108 first determines whether or not the vehicle flag is ON in order to search the vehicle range (step S403). Here, if the vehicle flag is not ON (no in step S403), the second vehicle identification unit 108 turns the vehicle flag ON (step S404). The second vehicle identification unit 108 then saves the direction as an initial vehicle range value (step S405). The first vehicle identification unit 106 repeats (loops) this process for each search direction X (step S406).

On the other hand, if the vehicle flag is already ON (yes in step S403), the loop process is continued by returning to step S401 from step S409.

If the rate of occurrence is below the second threshold value N (no in step S402), the second vehicle identification unit 108 determines whether or not the vehicle flag is ON (step S407). Here, if the vehicle flag is ON (yes in step S407), the second vehicle identification unit 108 saves the previous search direction as a terminal position for the vehicle range (step S408). The loop process starting from step S401 is then continued (step S406).

However, if the vehicle flag is not ON (no in step S407), the second vehicle identification unit 108 continues the loop process which starts from step S401 (step S406).

After the loop process has been performed for all of the search directions X included in the search region, the second vehicle identification unit 108 identifies, as the direction in which the second vehicle is present, the vehicle range from the initial vehicle range value to the terminal position (step S409). A range of directions in which a vehicle is present and for which rates of occurrence are greater than or equal to the second threshold value is identified with this process flow.

Finally, the vehicle display unit 109 displays the vehicle in the identified direction (step S108 in FIG. 18).

It is to be noted that the vehicle direction identification device 110A may search for the identification of the first vehicle and the identification of the second vehicle from a certain direction depending on the situation, similar to the first embodiment. Furthermore, it is acceptable to search for the second vehicle according to the direction of travel of the first vehicle. This will be explained in detail below.

A situation posing a risk of collision in an intersection exists in which the user assumes there is only one vehicle in an intersection, enters the intersection assuming it is safe after the one vehicle passes by, and collides into another vehicle. Therefore, it is acceptable to identify the second vehicle based on the search direction calculated with the method described in the present disclosure if, for example, the first vehicle is identified and has traveled in front of the user vehicle.

Additionally, as an alternate embodiment of the present disclosure, it is acceptable to alert the driver with a warning and display the identified the second vehicle if, for example, the first vehicle is identified and has traveled in front of the user vehicle. By warning the driver who assumes it is safe after the first vehicle has passed by, it is possible to avoid the risk of collision with the second vehicle.

It is to be noted that the vehicle direction identification device according to the first and second embodiments can function successfully in the same manner even without equipment of the vehicle sound detection microphone 101 and 102 and the vehicle display unit 109.

Specifically, even if the vehicle direction identification device is not equipped with the vehicle sound detection microphone 101 and 102, it is acceptable if surrounding sound is obtained by a microphone externally fitted to the vehicle direction identification device. The vehicle direction identification device functions successfully in the same manner as it does when equipped with the vehicle sound detection microphone 101 and 102 when a signal of the obtained surrounding sound is transmitted and input into the vehicle direction identification device wirelessly or by wire.

Furthermore, even if the vehicle direction identification device is not equipped with the vehicle display unit 109, the vehicle direction identification device functions successfully in the same manner as it does when equipped with the vehicle display unit 109 when information necessary for displaying the direction in which a vehicle is present (for example, identified value of vehicle position, number of vehicles and such) is output to an external display unit.

Figure 23:
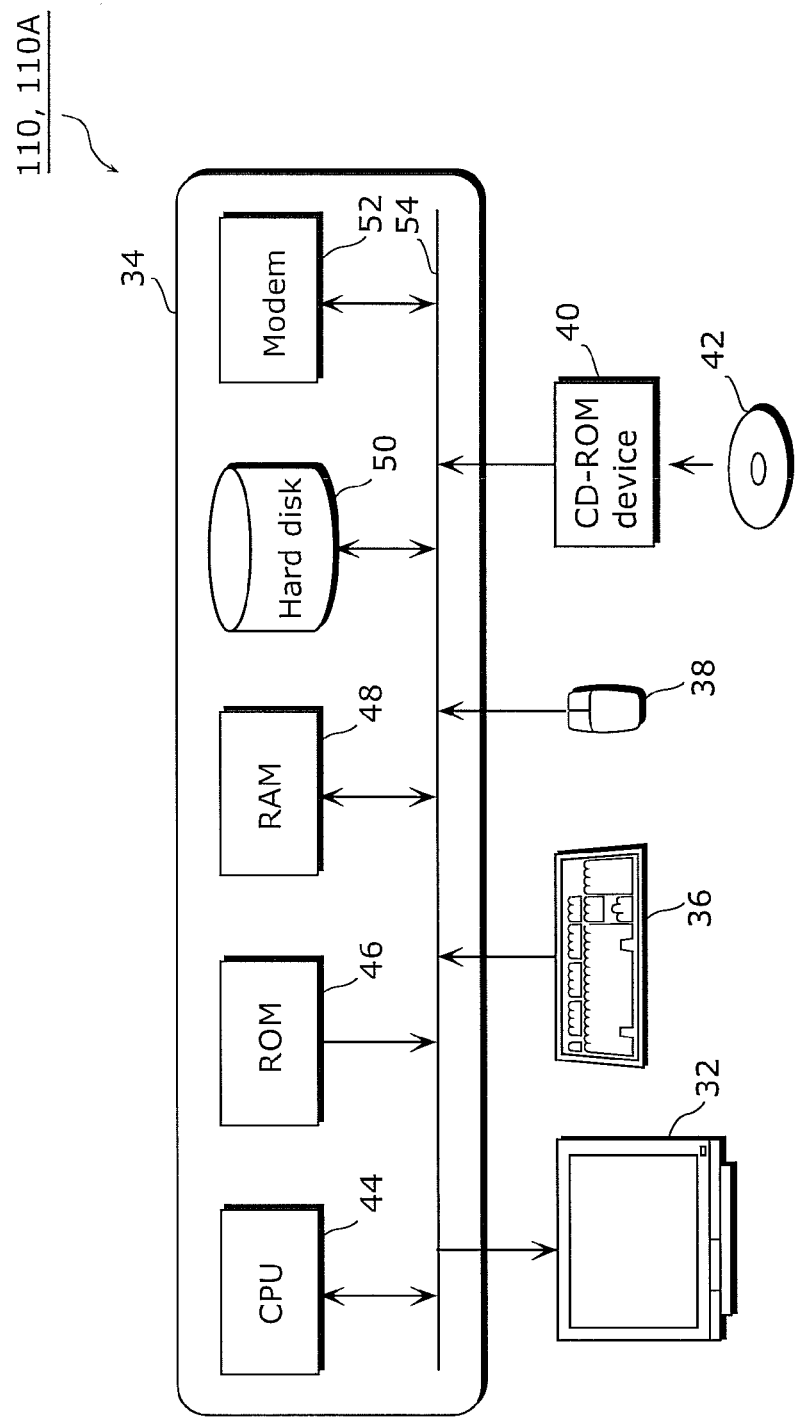
FIG. 23 is a block diagram showing the hardware configuration of a computer system implemented as the vehicle direction identification device according to the first and second embodiment.

It is to be noted that the vehicle direction identification device described in the first and second embodiment can be implemented as a computer. FIG. 23 is a block diagram showing the vehicle direction identification device implemented as a configuration of computer system hardware.

The vehicle direction identification device includes a computer 34, a keyboard 36 and a mouse 38 for inputting commands into the computer 34, a display 32 for displaying information such as computations made by the computer 34, a Compact Disc-Read Only Memory (CD-ROM) device 40 and a modem (not shown in drawing) for reading programs executed by the computer 34.

The program which is processed by the vehicle direction identification device is recorded on a CD-ROM 42, which is a computer-readable medium, then read by the CD-ROM device 40, or read by a modem 52 over a computer network.

The computer 34 includes a central processing unit (CPU) 44, read only memory (ROM) 46, random access memory (RAM) 48, a hard disk 50, the modem 52, and a bus 54.

The CPU 44 executes the program read via the CD-ROM device 40 or the modem 52. The ROM 46 stores programs and/or data necessary for the computer 34 to operate. The RAM 48 stores data such as parameters when a program is executed. The hard disk 50 stores programs and/or data. The modem 52 communicates with other computers via a computer network. The bus 54 connects the CPU 44, the ROM 46, the RAM 48, the hard disk 50, the modem 52, the display 32, the keyboard 36, the mouse 38, and the CD-ROM device 40.

Furthermore, a portion or all of the components of each of the preceding devices may be configured from one system LSI (Large Scale Integration). A system LSI is a super-multifunction LSI manufactured with a plurality of components integrated on a single chip, and specifically is a computer system configured of a microprocessor, ROM, and RAM, for example. The computer program is stored in the RAM. The system LSI achieves its function as a result of the microprocessor operating according to the computer program.

Still furthermore, a portion or all of the components of each of the preceding devices may each be configured from a detachable IC card or a stand-alone module. The IC card and the module are computer systems configured from a microprocessor, ROM, and RAM, for example. The IC card and the module may include the super-multifunction LSI described above. The IC card and the module achieve their function as a result of the microprocessor operating according to a computer program. The IC card and the module may be tamper-proof.

Moreover, the present disclosure may be realized as the above-described method. Moreover, the present disclosure may also be a computer program realizing these methods with a computer, or a digital signal of the computer program.

Furthermore, the present disclosure may also be realized as the computer program or the digital signal stored on storage media readable by a computer, such as a flexible disk, hard disk, CD-ROM, MO, DVD, DVD-ROM, DVD-RAM, DVD-RAM, BD (Blu-ray Disc (registered trademark)), USB memory, memory card such as an SD card, or a semiconductor memory. The present invention may also be the digital signal stored on the above mentioned storage media.

Moreover, the present disclosure may also be realized by transmitting the computer program or the digital signal, for example, via an electric communication line, a wireless or wired line, a network such as the Internet, or data broadcasting.

Moreover, the present disclosure may be a computer system including memory storing the computer program and a microprocessor operating according to the computer program.

Moreover, the computer program or the digital signal may be implemented by an independent computer system by being stored on the storage media and transmitted, or sent via the network.

Furthermore, the preceding embodiments and the preceding variation examples may be individually combined.

The disclosed embodiments are exemplifications in all aspects, and are not intended to be limiting. Equivalents of the Claims and various modifications are intended to be included in these exemplary embodiments which do not depart from the principles and spirit of the inventive concept, the scope of which is defined in the appended Claims and not the above-described exemplary embodiments.

Industrial Applicability

One or more exemplary embodiments disclosed herein are applicable to vehicle direction identification devices, and in particular to a vehicle direction identification device that can detect the direction in which vehicles are present, including a first vehicle and a second vehicle.

The invention claimed is:

1. A vehicle direction identification device which identifies a direction in which each of a plurality of vehicles including a first vehicle and a second vehicle is present from surrounding sound that is detected by a plurality of microphones and includes vehicle sound originating from the plurality of vehicles, the vehicle direction identification device comprising:
   a processor; and
   a non-transitory memory having stored thereon executable instructions, which when executed, cause the processor to perform:
      analyzing at least one of amplitude and phase of the surrounding sound in each of a plurality of analysis sections specified by predetermined frequency bands and predetermined time intervals;
      identifying, based on a result of the analysis obtained in the analyzing, a sound source direction for each of the plurality of analysis sections, the sound source direction indicating a direction from which a sound included in the surrounding sound originates;
      calculating rates of occurrence for respective sound source directions included in the sound source direction, and identifying, as a direction in which the first vehicle is present, one or more of the sound source directions for which a corresponding one or more of the rates of occurrence calculated is greater than or equal to a first threshold value for identifying a direction in which the first vehicle is present. the first threshold value being included in first vehicle identification information, the rates of occurrence each being a count of one or more of the plurality of analysis sections of a corresponding one of the sound source directions;
      calculating second vehicle identification information which (i) includes a second threshold value that is lower than the first threshold value and (ii) is for identifying a direction in which the second vehicle is present; and
      identifying, as a direction in which the second vehicle is present, one or more of the sound source directions for which a corresponding one or more of the rates of occurrence calculated is greater than or equal to the second threshold value included in the second vehicle identification information,
   wherein in the calculating of the second vehicle identification information, the second threshold value is calculated so that the second threshold value is smaller as a total value of the rates of occurrence for the one or more of the sound source directions corresponding to the direction identified as the direction in which the first vehicle is present increases.

2. The vehicle direction identification device according to claim 1,
   wherein the identifying of the sound source direction includes identifying, for each of the plurality of analysis sections, an angle as the sound source direction, the angle corresponding to a difference in arrival time of the surrounding sound between the plurality of microphones.

3. The vehicle direction identification device according to claim 1,
   wherein the executable instructions, when executed, cause the processor to further perform:
      identifying a direction of travel of the first vehicle from a change over time in the direction in which the first vehicle is present as identified in the identifying the direction in which the first vehicle is present, and
   the calculating of the second vehicle identification information includes (i) calculating, from among a plurality of the sound source directions included in the sound source direction identified in the identifying the sound source direction, as a second vehicle search range, a plurality of sound source directions included in a direction that is opposite the direction of travel of the first vehicle, excluding the sound source direction that corresponds to the direction identified as the direction in which the first vehicle is present, and (ii) calculating the second vehicle identification information which includes the second vehicle search range.

4. The vehicle direction identification device according to claim 3,
wherein the identifying the direction in which the first vehicle is present includes identifying, for each of a plurality of predetermined time periods, the direction in which the first vehicle is present from surrounding sound detected in one of the predetermined time periods, and
the identifying the direction of travel of the first vehicle from the change over time includes identifying, as the direction of travel of the first vehicle, a direction from the previously identified direction in which the first vehicle was present towards the currently identified direction in which the first vehicle is present.

5. The vehicle direction identification device according to claim 4,
wherein in the identifying the direction in which the second vehicle is present, the direction in which the second vehicle is present is identified from the plurality of sound source directions included in the second vehicle search range.

6. The vehicle direction identification device according to claim 1,
wherein at least one of the first threshold value and the second threshold value is different for each of the predetermined frequency bands.

7. The vehicle direction identification device according to claim 1,
wherein the first threshold value includes a plurality of frequency bands and a plurality of frequency-specific threshold values associated with the plurality of frequency bands in a one-to-one relationship, the plurality of frequency-specific threshold values being set to increase as an associated one of the plurality of frequency bands increases, and
the identifying the direction in which the first vehicle is present includes, for each analysis region, calculating the rates of occurrence for the respective sound source directions, and identifying, as the direction in which the first vehicle is present, one or more of the sound source directions for which a corresponding one or more of the rates of occurrence calculated is greater than or equal to one of the plurality of frequency-specific threshold values that is associated with one of the plurality of frequency bands in which the analysis region is included, the analysis region being a collection of the plurality of analysis sections in each of the plurality of frequency bands from among the plurality of analysis sections, and the plurality of frequency-specific threshold values being included in the first threshold value.

8. The vehicle direction identification device according to claim 1,
wherein in the calculating the second vehicle identification information, (i) the second threshold value is set for the one or more of the sound source directions corresponding to the direction identified as the direction in which the first vehicle is present to the same value as the first threshold value and (ii), the second threshold value is set for a sound source direction other than the sound source directions to a value calculated to decrease as a ratio increases, the ratio being of a total value of the rates of occurrence of a plurality of sound source directions included in the sound source direction to a total value of the rates of occurrence of the one or more of the sound source directions corresponding to the direction identified as the direction in which the first vehicle is present.

9. The vehicle direction identification device according to claim 1,
wherein in the identifying the direction in which the second vehicle is present, the direction in which the second vehicle is present is identified from the plurality of sound source directions other than the one or more of the sound source directions corresponding to the direction identified as the direction in which the first vehicle is present.

10. The vehicle direction identification device according to claim 1,
wherein in calculating the second vehicle identification information, the second threshold value is calculated, for each analysis region so that the second threshold value is smaller as (i) a ratio of a total value of the rates of occurrence of all of the sound source directions to a total value of the rates of occurrence for the one or more of the sound source directions corresponding to the direction identified as the direction in which the first vehicle is present increases, and as (ii) a frequency corresponding to the analysis region decreases, the analysis region being a collection of the plurality of analysis sections in each of the plurality of predetermined frequency bands.

11. The vehicle direction identification device according to claim 1,
wherein at least one of the identifying the direction in which first vehicle is present and the identifying the direction in which second vehicle is present includes assigning greater weight to an analysis section among the plurality of analysis sections having a higher degree of similarity to an adjacent one of the plurality of analysis sections with respect to the respective sound source directions, and calculating the rates of occurrence for the respective sound source directions as a count of the weighted plurality of analysis sections in a corresponding one of the sound source directions.

12. The vehicle direction identification device according to claim 1,
wherein the first vehicle identification information includes a plurality of sound pressure-specific threshold values which are threshold values associated with a plurality of analysis regions in a one-to-one relationship, the plurality of analysis regions each being a collection of the plurality of analysis sections included in each of the plurality of frequency bands, and
in the identifying the direction in which the first vehicle is present, one of the plurality of analysis regions is not used to identify the direction in which the first vehicle is present when an average amplitude value of the plurality of analysis sections included the one of the plurality of analysis regions is less than the sound pressure-specific threshold value associated with the frequency band corresponding to the one of the plurality of analysis regions from which the average amplitude value is calculated.

13. A vehicle direction identification method of identifying a direction in which each of a plurality of vehicles including a first vehicle and a second vehicle is present from surrounding sound that is detected by a plurality of microphones and includes vehicle sound originating from the plurality of vehicles, the vehicle direction identification method comprising:
analyzing at least one of amplitude and phase of the surrounding sound in each of a plurality of analysis sections specified by predetermined frequency bands and predetermined time intervals;
identifying, based on an analysis result obtained in the analyzing, a sound source direction for each of the plurality of analysis sections, the sound source direction indicating a direction from which a sound included in the surrounding sound originates;

calculating rates of occurrence for respective sound source directions included in the sound source direction, and identifying, as a direction in which the first vehicle is present, one or more of the sound source directions for which a corresponding one or more of the rates of occurrence calculated is greater than or equal to a first threshold value for identifying a direction in which the first vehicle is present, the first threshold value being included in first vehicle identification information, the rates of occurrence each being a count of one or more of the plurality of analysis sections of a corresponding one of the sound source directions;

calculating second vehicle identification information which (i) includes a second threshold value that is lower than the first threshold value and (ii) is for identifying a direction in which the second vehicle is present; and identifying, as a direction in which the second vehicle is present, one or more of the sound source directions for which a corresponding one or more of the rates of occurrence calculated is greater than or equal to the second threshold value included in the second vehicle identification information, wherein in the calculating of the second vehicle identification information, the second threshold value is calculated so that the second threshold value is smaller as a total value of the rates of occurrence for the one or more of the sound source directions corresponding to the direction identified as the direction in which the first vehicle is present increase.

14. A non-transitory computer-readable recording medium for use in a computer, the recording medium having a computer program recorded thereon for causing the computer to execute the vehicle direction identification method according to claim 13.

15. An integrated circuit which identifies a direction in which each of a plurality of vehicles including a first vehicle and a second vehicle is present from surrounding sound that is detected by a plurality of microphones and includes vehicle sound originating from the plurality of vehicles, the integrated circuit comprising:

a processor; and a non-transitory memory having stored thereon executable instructions, which when executed, cause the processor to perform:

analyzing at least one of amplitude and phase of the surrounding sound in each of a plurality of analysis sections specified by predetermined frequency bands and predetermined time intervals;

identifying, based on a result of the analysis obtained in the analyzing a sound source direction for each of the plurality of analysis sections, the sound source direction indicating a direction from which a sound included in the surrounding sound originates;

calculating rates of occurrence for respective sound source directions included in the sound source direction, and identifying, as a direction in which the first vehicle is present, one or more of the sound source directions for which a corresponding one or more of the rates of occurrence calculated is greater than or equal to a first threshold value for identifying a direction in which the first vehicle is present, the first threshold value being included in first vehicle identification information, the rates of occurrence each being a count of one or more of the plurality of analysis sections of a corresponding one of the sound source directions;

calculating second vehicle identification information which (i) includes a second threshold value that is lower than the first threshold value and (ii) is for identifying a direction in which the second vehicle is present; and identifying, as a direction in which the second vehicle is present, one or more of the sound source directions for which a corresponding one or more of the rates of occurrence calculated is greater than or equal to the second threshold value included in the second vehicle identification information, wherein in the calculating of the second vehicle identification information, second threshold value is calculated so that the second threshold value is smaller as a total value of the rates of occurrence for the one or more of the sound source directions corresponding to the direction identified as the direction in which the first vehicle is present increases.

\* \* \* \* \*